US008726623B2

(12) United States Patent
    Kiel et al.

(10) Patent No.: US 8,726,623 B2
(45) Date of Patent: May 20, 2014

(54) CROP DIVIDER HINGE KIT AND METHOD

(71) Applicants: Mark W. Kiel, Columbus, IN (US); Kenneth Ray Kiel, Columbus, IN (US)

(72) Inventors: Mark W. Kiel, Columbus, IN (US); Kenneth Ray Kiel, Columbus, IN (US)

(73) Assignee: Divider Hinges LLC, Columbus, IN (US)

(*) Notice: Subject to any disclaimer, the term of this patent is extended or adjusted under 35 U.S.C. 154(b) by 0 days.

(21) Appl. No.: 14/090,366

(22) Filed: Nov. 26, 2013

(65) Prior Publication Data

US 2014/0083074 A1    Mar. 27, 2014

Related U.S. Application Data

(60) Provisional application No. 61/866,869, filed on Aug. 16, 2013.

(51) Int. Cl.
    *A01D 63/00*    (2006.01)
    *A01D 63/02*    (2006.01)

(52) U.S. Cl.
    USPC .............................................. 56/319; 56/314

(58) Field of Classification Search
    USPC .......................................... 56/314, 318–320
    See application file for complete search history.

(56) References Cited

U.S. PATENT DOCUMENTS

| 57,656 | A | | 9/1866 | Alden |
|---|---|---|---|---|
| 365,771 | A | * | 7/1887 | Bachman ........................ 56/314 |
| 703,497 | A | | 7/1902 | Steward |
| 1,788,102 | A | | 1/1931 | Gilbert |
| 1,859,208 | A | | 5/1932 | Kane |
| 2,209,047 | A | | 7/1940 | Asbridge et al. |
| 2,629,465 | A | | 2/1953 | Rhea |
| 2,895,757 | A | | 7/1959 | Scoras |
| 3,563,592 | A | | 2/1971 | Preston |
| 3,608,753 | A | * | 9/1971 | Scott .............................. 414/345 |
| 4,087,954 | A | | 5/1978 | Reese, Sr. |
| 4,296,593 | A | | 10/1981 | Webb et al. |
| 4,330,983 | A | * | 5/1982 | Moore ............................ 56/314 |
| 4,917,322 | A | | 4/1990 | Combs |
| 6,715,273 | B2 | * | 4/2004 | Weichholdt ..................... 56/314 |
| 7,051,503 | B2 | | 5/2006 | Weichholdt |

FOREIGN PATENT DOCUMENTS

| DE | 1 926 441 A | 11/1970 |
|---|---|---|
| DE | 128 878 A | 12/1977 |
| DE | 101 46 768 A | 4/2003 |

* cited by examiner

*Primary Examiner* — Alicia Torres
(74) *Attorney, Agent, or Firm* — Roberts IP Law; John Roberts

(57) ABSTRACT

Provided is a simple, inexpensive, truly feasible technical solution that readily permits do-it-yourself retrofitting of existing combine harvester heads to allow their crop dividers to pivot out of the way for transport. Provided is a retrofit hinge kit adapted for use with square tube frames and methods for its use.

20 Claims, 19 Drawing Sheets

CROP DIVIDER HINGE KIT AND METHOD

CROSS-REFERENCE TO RELATED APPLICATIONS

The present application claims priority to and incorporates herein by reference U.S. Provisional Patent Application Ser. No. 61/866,869 to Kiel et al., Entitled Crop Divider Pivotable Conversion Apparatus, System and Method, which was filed Aug. 16, 2013.

FEDERALLY SPONSORED RESEARCH OR DEVELOPMENT

None.

TECHNICAL FIELD

The present invention relates generally to agricultural machinery, and more specifically to combine harvester heads having positionally fixed crop dividers.

BACKGROUND

In harvesting machines such as combines that have a harvester head, it is well known to provide an outer crop divider that extends forward from the harvester head in the forward direction of travel of the harvesting machine, and which serves primarily to separate a particular section of crops to be cut from the remainder of the crops. These crop dividers have been designed with the secondary object of raising those crops near the divider (in cases where the crops tend to hang over or lie on the ground) so that those crops do not become entangled in the harvesting machine as it passes. Crop dividers have also been designed so that they do not present sharp corners or edges to the standing crops, which might break the stalks and cause the crops to hang over. To meet the above requirements, crop dividers of a semi-conical form have been used, which present a smooth and tapering surface to the crop. The functioning of harvesting machinery using a crop divider was described in U.S. Pat. No. 7,051,503 B2 to Dirk Weichholdt entitled Crop Divider, at FIG. 1 and in Column 2, line 58 through Column 3, line 32, which patent is incorporated herein by reference as if set forth herein in its entirety.

Crop dividers have had the disadvantage that they have often been relatively fixed in position with respect to the harvester head, so that their adjustment was of a limited nature only. Thus, an important disadvantage of typical crop dividers is that when it is required to transport the harvesting machine, the crop divider cannot be folded and had to be detached. Detaching, separately transporting, and re-attaching crop dividers to harvester heads is cumbersome due to their bulky size, and difficult in part because the attachment mechanism is often spring-loaded. Accordingly, in practice harvester heads are often transported on public roads with the crop dividers in place and sticking out beyond the width of the traffic lane, notwithstanding the safety risks. This is the case with the vast majority of old and modern harvesting equipment, even though several other patented systems have long attempted to address this issue.

For example, U.S. Pat. No. 703,497 to John F. Steward, issued Jul. 1, 1902 and entitled Grain-Divider For Harvesters, attempted to address this issue by providing a mechanism whereby the crop divider could be tilted upward and retracted backwards. Similarly, U.S. Pat. No. 1,859,208 to Kane Paul and assigned to the International Harvester Company, issued May 17, 1932 and entitled Harvester, as well as U.S. Pat. No. 2,209,047 to Edmund M. Asbridge et al. and assigned to the International Harvester Company, issued Jul. 23, 1940 and entitled Harvester, likewise attempted to solve this problem by providing crop dividers that could be tilted upward and retracted backwards. U.S. Pat. No. 4,087,954 to Arthur Reese Sr., issued May 9, 1978 and entitled Retractable Crop Gathering Finger Construction, attempted to solve the issue by providing a complex telescoping-retractable crop divider. All of the patents identified above are incorporated herein by reference as if set forth herein in their entirety. But unfortunately, none of these mechanisms have been widely adopted in the industry, likely because of their complexity, expense, lack of robustness, and their unsuitability for working with the bulkier geometries of modern crop dividers.

U.S. Pat. No. 6,715,273 B2 to Dirk Weichholdt and assigned to Deere & Company, issued Apr. 6, 2004 and entitled Stalk Divider, took another approach to solving the problem, namely providing a locking pivoting joint (shown in FIGS. 2-4) as part of a curved, round-cross-section tube that connected the crop divider to the harvester head (as shown in FIG. 1). That patent is incorporated herein by reference in its entirety. While rather complex, the mechanism described in this patent was meant to allow the crop divider to be folded to the side to allow the harvester head to be transported without the necessity of removing the crop divider from the harvester head. Later on in U.S. Pat. No. 7,051,503 B2, issued to the same inventor on May 30, 2006 and entitled Crop Divider, Mr. Weichholdt proposed a simpler structure to use in connection with the same curved, round-cross-section tube. Both of these patents admitted in their specifications that pivoting crop head dividers were already patented in at least three prior patents, namely DE 1 926 441 A, DD 128 878 A, and DE 101 46 768 A, but each unique design was granted a separate patent specific to that design.

While U.S. Pat. Nos. 6,715,273 and 7,051,503 provide potential solutions for future products (the present inventors are not aware of these designs having ever been available on the market), this does not help the many thousands of owners of existing harvester heads where the crop dividers are fixedly connected to the harvester head by a frame comprising straight sections of square tubing, especially where there are one or more additional support members connecting the crop divider to the harvester head. These existing harvester heads could not feasibly be retrofitted with the designs shown in U.S. Pat. Nos. 6,715,273 and 7,051,503, or any of the other designs that have been reviewed. In practice none of these designs have been widely adopted, if at all, and the vast majority of existing combine harvester heads still have fixed crop dividers that do not pivot. Accordingly, what is needed is a simple, inexpensive, truly feasible technical solution that readily permits do-it-yourself retrofitting of existing combine harvester heads to allow their crop dividers to easily pivot.

SUMMARY

The present invention elegantly addresses all the above challenges and provides numerous additional benefits as shown and described herein. Provided in certain example embodiments is a method of converting a crop divider fixedly connected to a harvester head into a crop divider pivotably connected to the harvester head, where the crop divider is fixedly connected to the harvester head by a frame comprising square tubing, the method comprising the steps of: removing the square tubing portion of the frame from the harvester head; cutting off a predetermined length of the square tubing from the end of the square tubing portion that was connected to the harvester head; connecting a crop divider hinge kit to that portion of the harvester head to which the square tubing portion of the frame was connected, the crop divider hinge kit comprising: a replacement portion of square tubing adapted to connect to that portion of the harvester head to which the square tubing portion of the frame was connected, and further adapted to replace the predetermined length of square tubing that was cut off from the frame; a sleeve portion pivotably connected with the replacement portion of square tubing and defining a hollow portion having an inner profile approximating the outer profile of the square tubing and adapted to receive therein and be affixed to that part of the square tubing comprising the end of the frame from which the predetermined length of square tubing was cut; the crop divider hinge kit adapted to alternately lock the crop divider in a first longitudinally extending position appropriate for use in dividing crops and in a second position extending longitudinally approximately perpendicular to the first position, when the replacement portion of square tubing is connected to the harvester head and the end of the frame from which the predetermined length of square tubing was cut is affixed to sleeve portion; connecting the crop divider to the crop divider hinge kit by placing the square tubing comprising the end of the frame from which the predetermined length of square tubing was cut into the hollow portion of the sleeve and affixing said tubing to said sleeve; and alternately locking the crop divider in a first longitudinally extending position appropriate for use in dividing crops and a second position extending longitudinally approximately perpendicular to the first longitudinally extending position.

Provided in certain example embodiments is a method of converting a crop divider fixedly connected to a harvester head into a crop divider pivotably connected to the harvester head, where the crop divider is fixedly connected to the harvester head by a frame comprising square tubing, the method comprising the steps of: removing the square tubing portion of the frame from the harvester head; cutting off a predetermined length of the square tubing from the end of the square tubing portion that was connected to the harvester head; connecting crop divider hinge means to that portion of the harvester head to which the square tubing portion of the frame was connected, the crop divider hinge means comprising: means for connecting a hinge to that portion of the harvester head to which the square tubing portion of the frame was connected, and for replacing the predetermined length of square tubing that was cut off from the frame; means for pivotably connecting the hinge to that part of the square tubing comprising the end of the frame from which the predetermined length of square tubing was cut; means for alternately locking the crop divider in a first longitudinally extending position appropriate for use in dividing crops and in a second position extending longitudinally approximately perpendicular to the first position, when the hinge is installed and connecting the crop divider to the harvester head; connecting the crop divider to the crop divider hinge means; and alternately locking the crop divider in a first longitudinally extending position appropriate for use in dividing crops and a second position extending longitudinally approximately perpendicular to the first longitudinally extending position.

Provided in certain example embodiments is a method of transporting a harvester head having a plurality of crop dividers fixedly connected thereto by frames comprising square tubing, the method comprising the steps of: removing the square tubing portion of the frame from the harvester head; cutting off a predetermined length of the square tubing from the end of the square tubing portion that was connected to the harvester head; connecting a crop divider hinge kit to that portion of the harvester head to which the square tubing portion of the frame was connected, the crop divider hinge kit comprising: a replacement portion of square tubing adapted to connect to that portion of the harvester head to which the square tubing portion of the frame was connected, and further adapted to replace the predetermined length of square tubing that was cut off from the frame; a sleeve portion pivotably connected with the replacement portion of square tubing and defining a hollow portion having an inner profile approximating the outer profile of the square tubing and adapted to receive therein and be affixed to that part of the square tubing comprising the end of the frame from which the predetermined length of square tubing was cut; the crop divider hinge kit adapted to alternately lock the crop divider in a first longitudinally extending position appropriate for use in dividing crops and in a second position extending longitudinally approximately perpendicular to the first position, when the replacement portion of square tubing is connected to the harvester head and the end of the frame from which the predetermined length of square tubing was cut is affixed to sleeve portion; connecting the crop divider to the crop divider hinge kit by placing the square tubing comprising the end of the frame from which the predetermined length of square tubing was cut into the hollow portion of the sleeve and affixing said tubing to said sleeve; repeating each of the above steps for each crop divider fixedly connected to the harvester head by a frame comprising square tubing; locking each crop divider in first longitudinally extending positions appropriate for use in dividing crops; attaching the harvester head to a combine; harvesting crops using the harvester head and the combine; detaching the harvester head from the combine; locking each crop divider in second positions extending longitudinally approximately perpendicular to the first longitudinally extending positions; loading the harvester head on a trailer; and transporting the harvester head on a public road from a first location to a second location.

In certain example embodiments the step of affixing said tubing to said sleeve may further comprise drilling holes through said tubing using holes in the sleeve as a template to guide the drilling. In certain example embodiments the step of affixing said tubing to said sleeve may further comprise fastening said tubing to said sleeve with one or more fasteners. In certain example embodiments the step of affixing said tubing to said sleeve may further comprise welding said tubing to said sleeve. In certain example embodiments the sleeve portion of the crop divider hinge kit may comprise second square tubing. In certain example embodiments the second square tubing may comprise a first portion comprising a top wall and a bottom wall separated by opposing first and second side walls, the first or second side wall being partially cut-away to form a pivot clearance window.

In certain example embodiments the replacement portion of square tubing is pivotably connected with the sleeve portion by a pivot member that passes from the top wall of the second square tubing, through the replacement portion of square tubing, to the bottom wall of the second square tubing, the pivot member positioned proximate the pivot clearance window such that the sleeve portion can pivot relative to the replacement portion of square tubing about the pivot member from a first position where the replacement portion of square tubing extends coaxially with the sleeve portion, to a second position where the longitudinal axis of the replacement portion of square tubing extends through the pivot clearance window and approximately perpendicularly to the longitudinal axis of the sleeve portion.

In certain example embodiments the step of locking the crop divider in a first longitudinally extending position appropriate for use in dividing crops further comprises: pivoting the sleeve portion relative to the replacement portion of square tubing about the pivot member to the first position where the replacement portion of square tubing extends coaxially with the sleeve portion; and inserting a locking member through the top wall of the second square tubing, through the replacement portion of square tubing, and through the bottom wall of the second square tubing.

In certain example embodiments the step of locking the crop divider in a second position extending longitudinally approximately perpendicular to the first longitudinally extending position further comprises: removing the locking member; pivoting the sleeve portion relative to the replacement portion of square tubing about the pivot member to the second position where the longitudinal axis of the replacement portion of square tubing extends through the pivot clearance window and approximately perpendicularly to the longitudinal axis of the sleeve portion; and inserting the locking member through the replacement portion of square tubing and simultaneously adjacent to recesses formed in the outer edges of the top and bottom walls of the second square tubing adjacent the pivot clearance window.

In certain example embodiments pivot member consists of a fastener that passes through the top wall, through the square tubing, and through the bottom wall. In certain example embodiments pivot member comprises a fastener having a shaft circumferentially surrounded by a compression-limiting spacer. In certain example embodiments locking member is selected from the group consisting of: a fastener, a pin, a button handle ball lock pin, a detent pin, a torsion clip, hair pin clip.

In certain example embodiments crop divider is further connected to the harvester head by a support member extending above the square tubing from the crop divider to the harvester head, the support member attached to the harvester head with a fastener, the method further comprising the step of: replacing the fastener with a quick-disconnect fastening mechanism; wherein the step of locking the crop divider in the first longitudinally extending position further comprises the step of attaching the support member to the harvester head by fastening the quick-disconnect fastening mechanism; and wherein the step of locking the crop divider in the second position extending longitudinally approximately perpendicular to the first longitudinally extending position further comprises the step of detaching the support member from the harvester head by unfastening the quick-disconnect fastening mechanism.

In certain example embodiments step of connecting the crop divider hinge kit to that portion of the harvester head to which the square tubing portion of the frame was connected further comprises: fastening the crop divider hinge kit to the harvester head using fasteners that had fastened the cut-off portion of the square tubing to the harvester head.

In certain example embodiments the square tubing comprises one-and-one-half-inch by one-and-one-half-inch nominal outside width and height ASTM A500 square tubing, and the sleeve portion comprises two-inch by two-inch nominal outside width and height ASTM A500 square tubing with 5 Gauge (0.220 inch) nominal wall thickness.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The accompanying figures illustrate certain aspects of example embodiments of the invention, where like numbers in various figures represent like components or steps.

DETAILED DESCRIPTION OF EXAMPLE EMBODIMENTS

Figure 1:
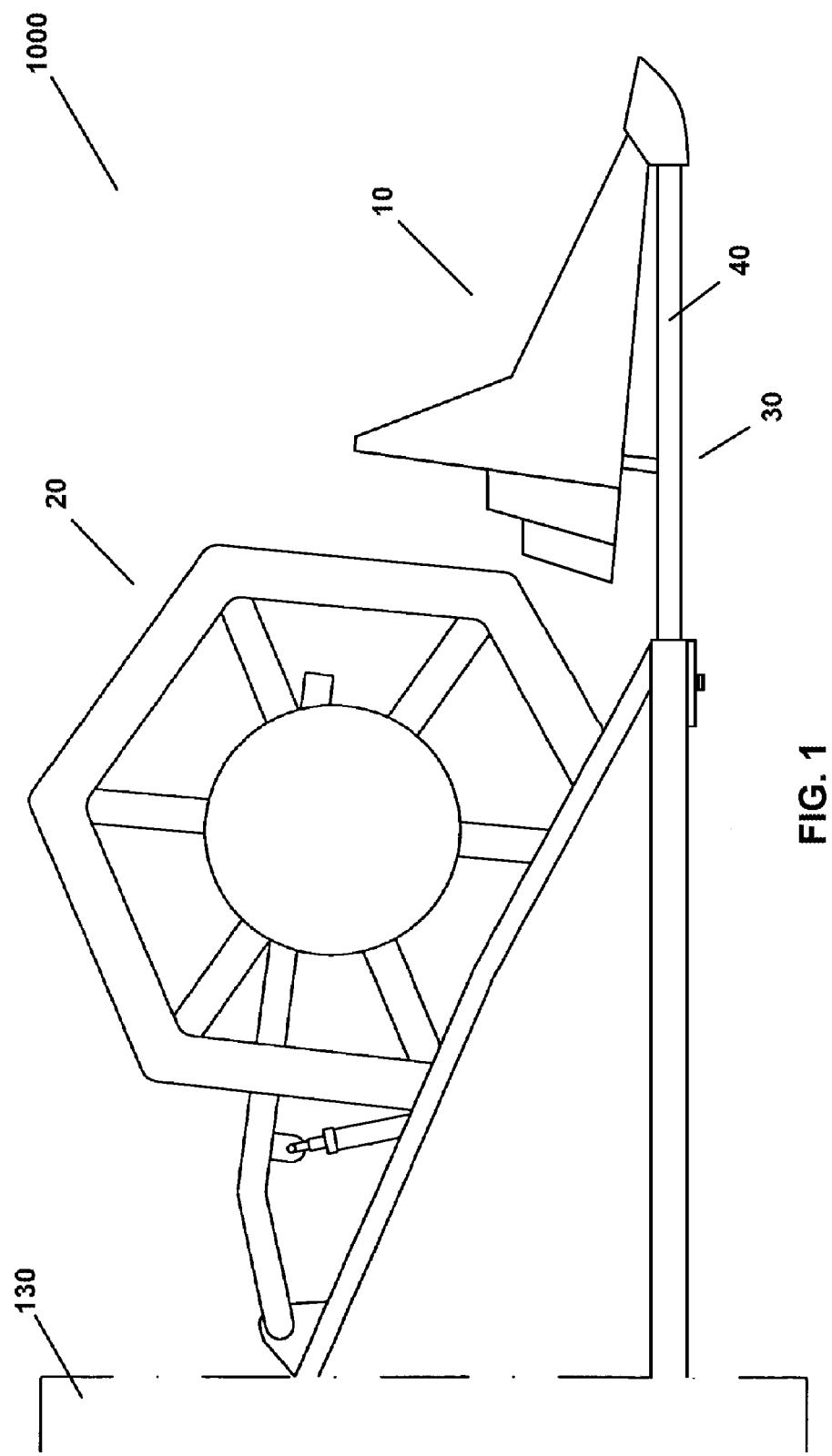
FIG. 1 is a right side elevation view of an example crop divider fixedly connected to an example harvester head.
Figure 2:
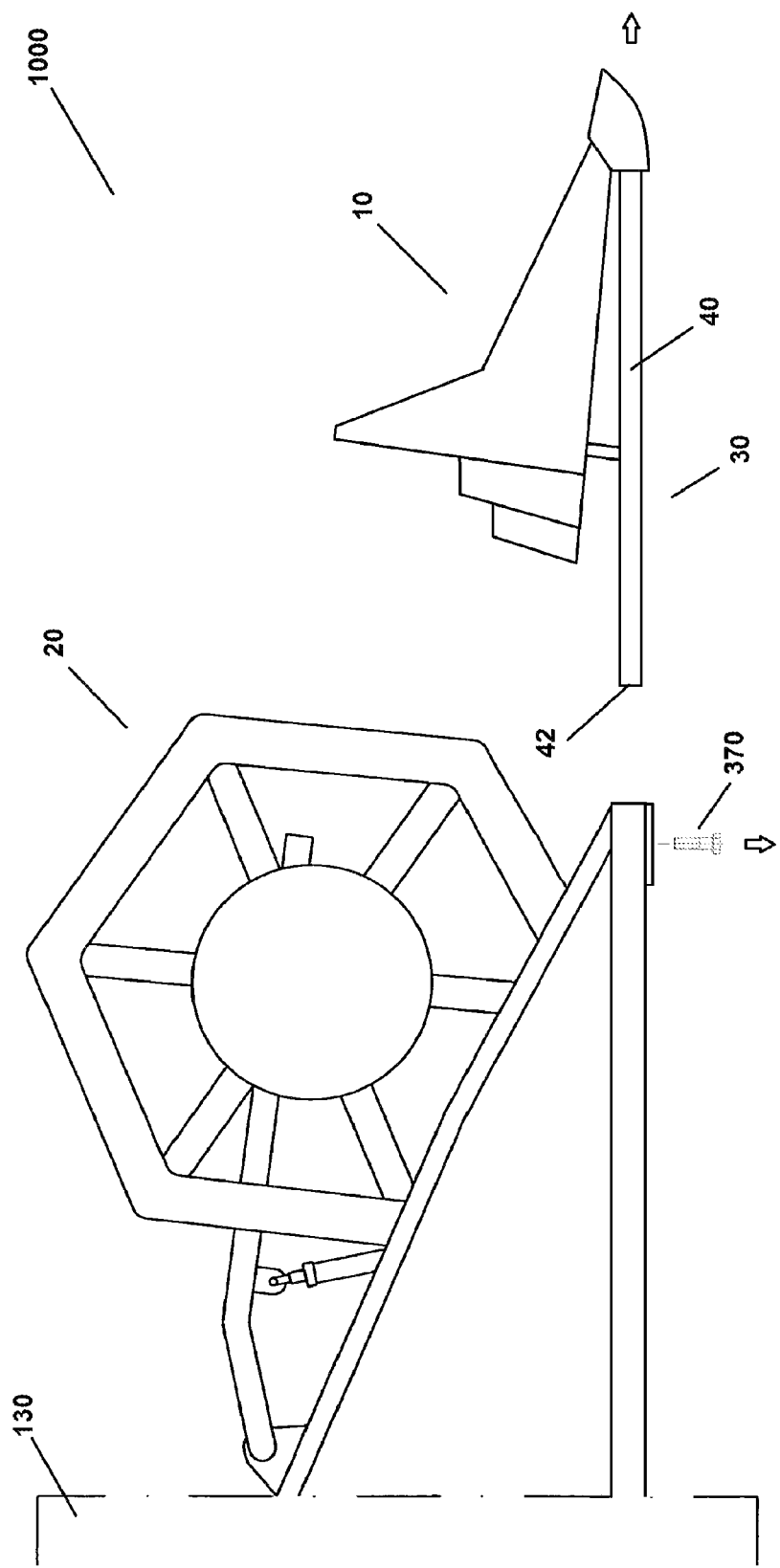
FIG. 2 is a right side elevation view of the assembly of FIG. 1, showing the crop divider being disassembled from the harvester head.
Figure 3:
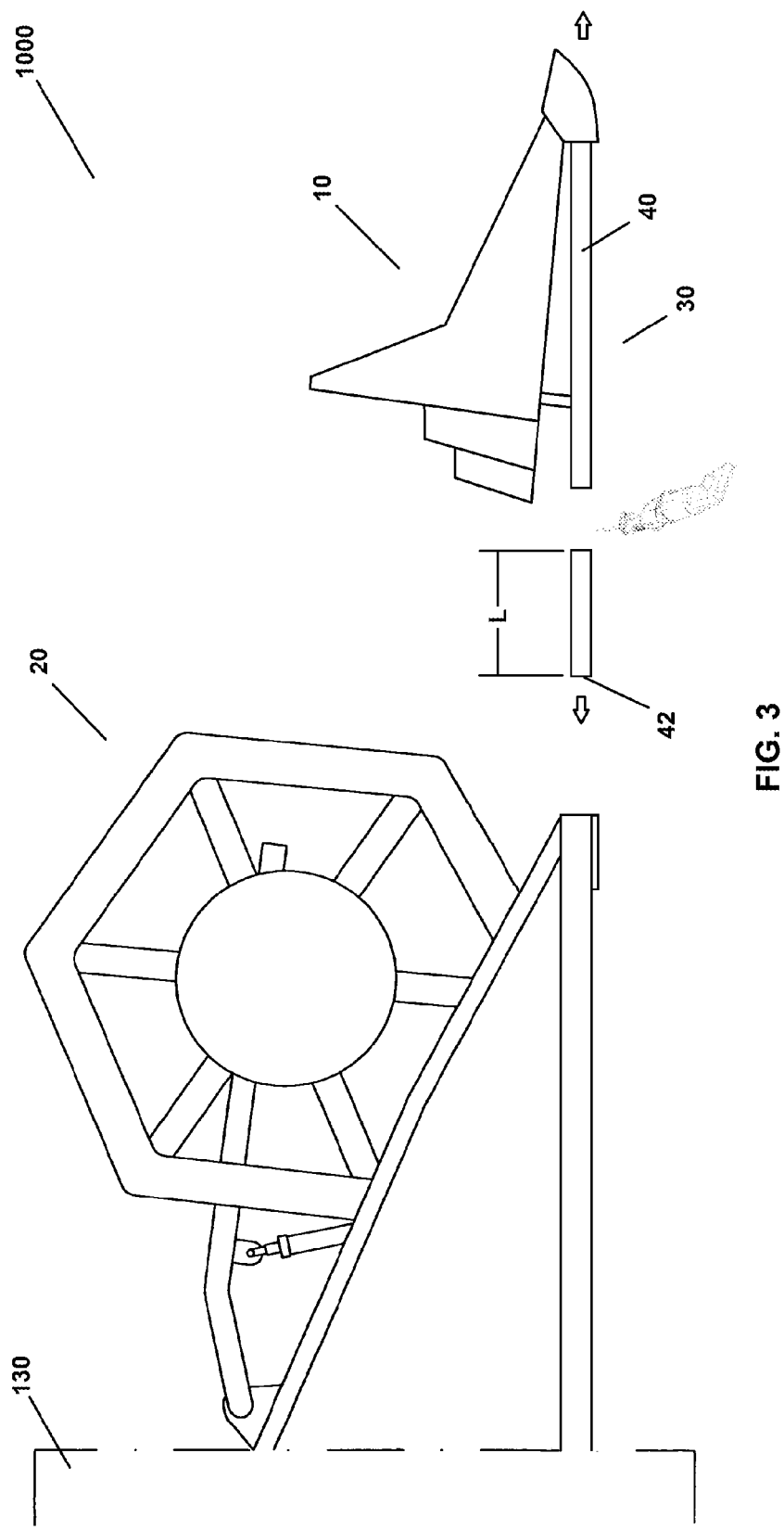
FIG. 3 is a right side elevation view of the disassembled parts from FIG. 2, depicting a length L being cut from the frame of the crop divider.
Figure 4:
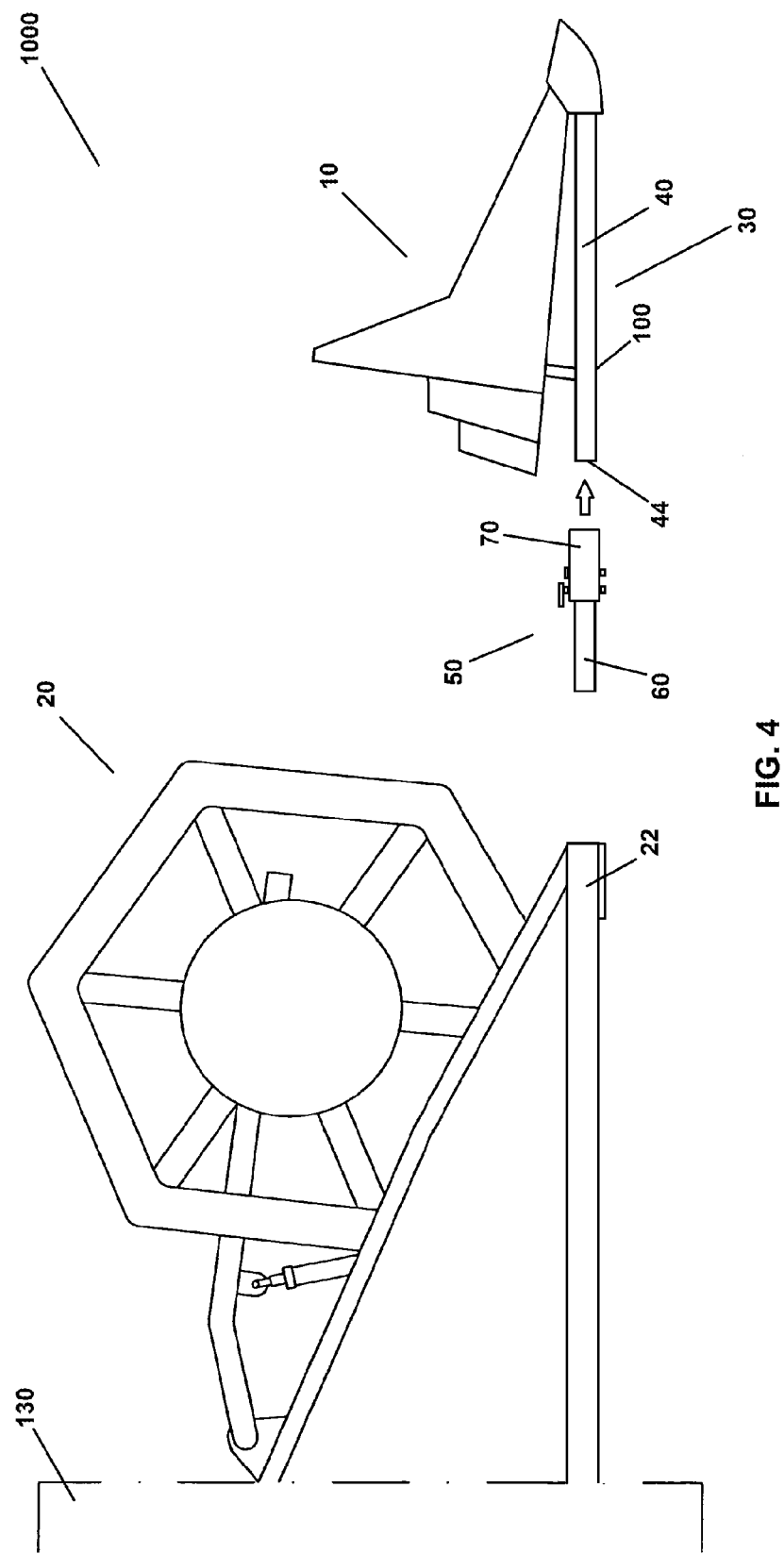
FIG. 4 is a right side elevation view of the crop divider of FIG. 3 after cutting, depicting an example crop divider hinge kit being positioned for assembly with the remaining portion of the crop divider frame and the harvester head.
Figure 5:
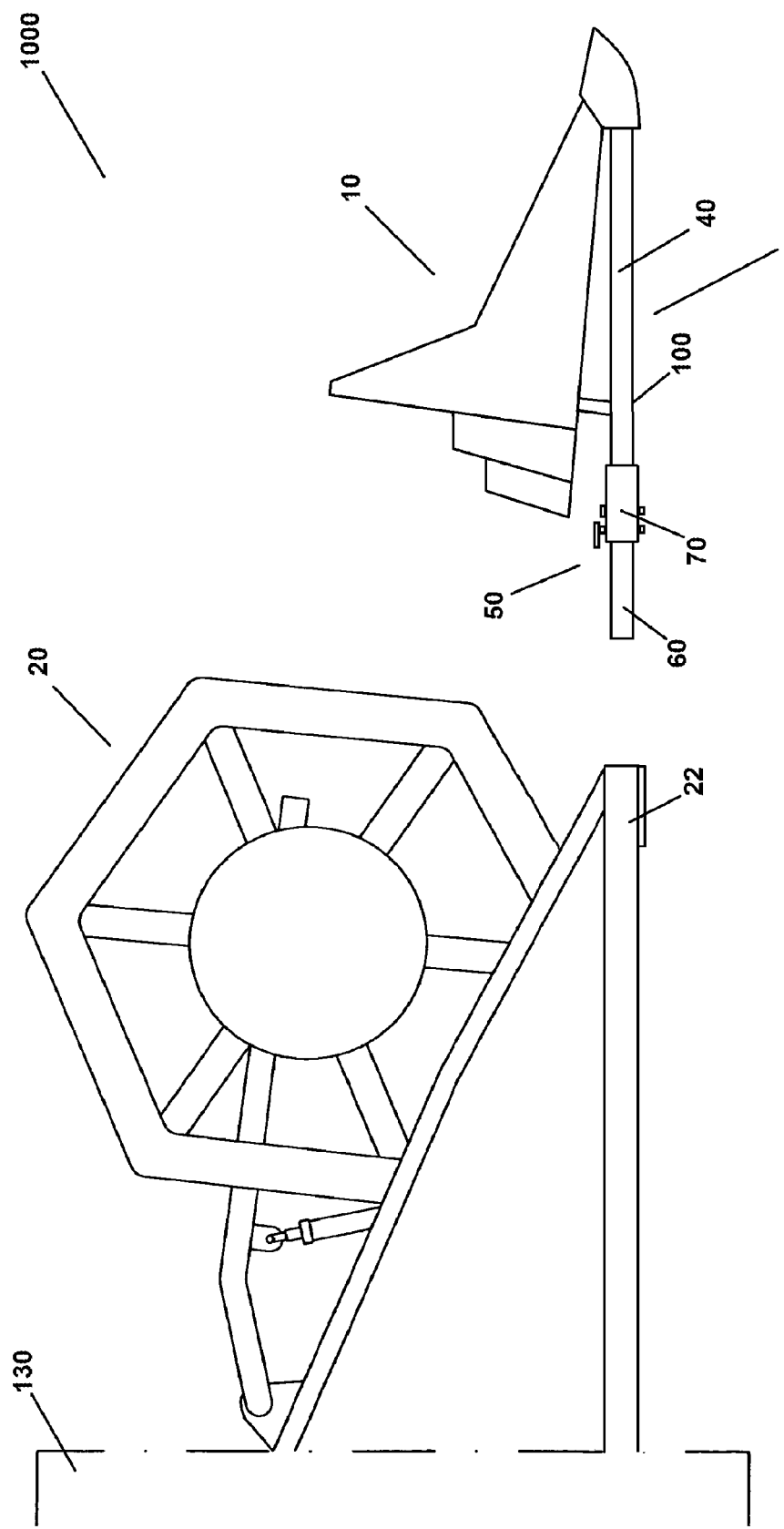
FIG. 5 is a right side elevation view of the crop divider of FIG. 4 after the example crop divider hinge kit has been initially assembled with the remaining portion of the crop divider frame (alternatively, the crop divider hinge kit may be assembled first to the harvester head; all steps herein may be completed in any suitable order).
Figure 6:
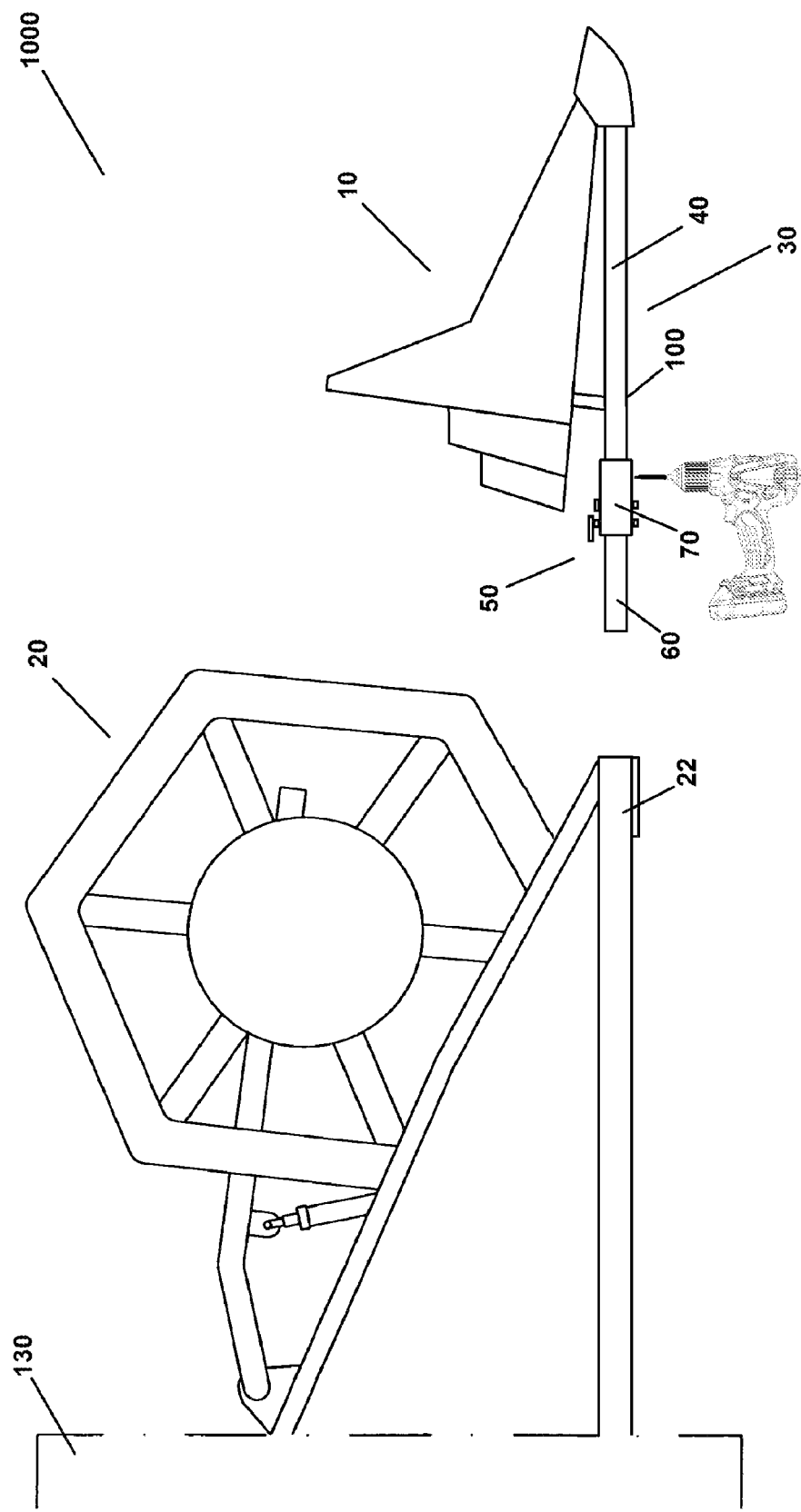
FIG. 6 is a right side elevation view of the crop divider of FIG. 5 with the example crop divider hinge kit initially assembled with the remaining portion of the crop divider frame, further depicting an example attachment means, namely drilling one or more fastener clearance holes through the crop divider frame using holes in the body of the hinge kit assembly as a guide or template.
Figure 7:
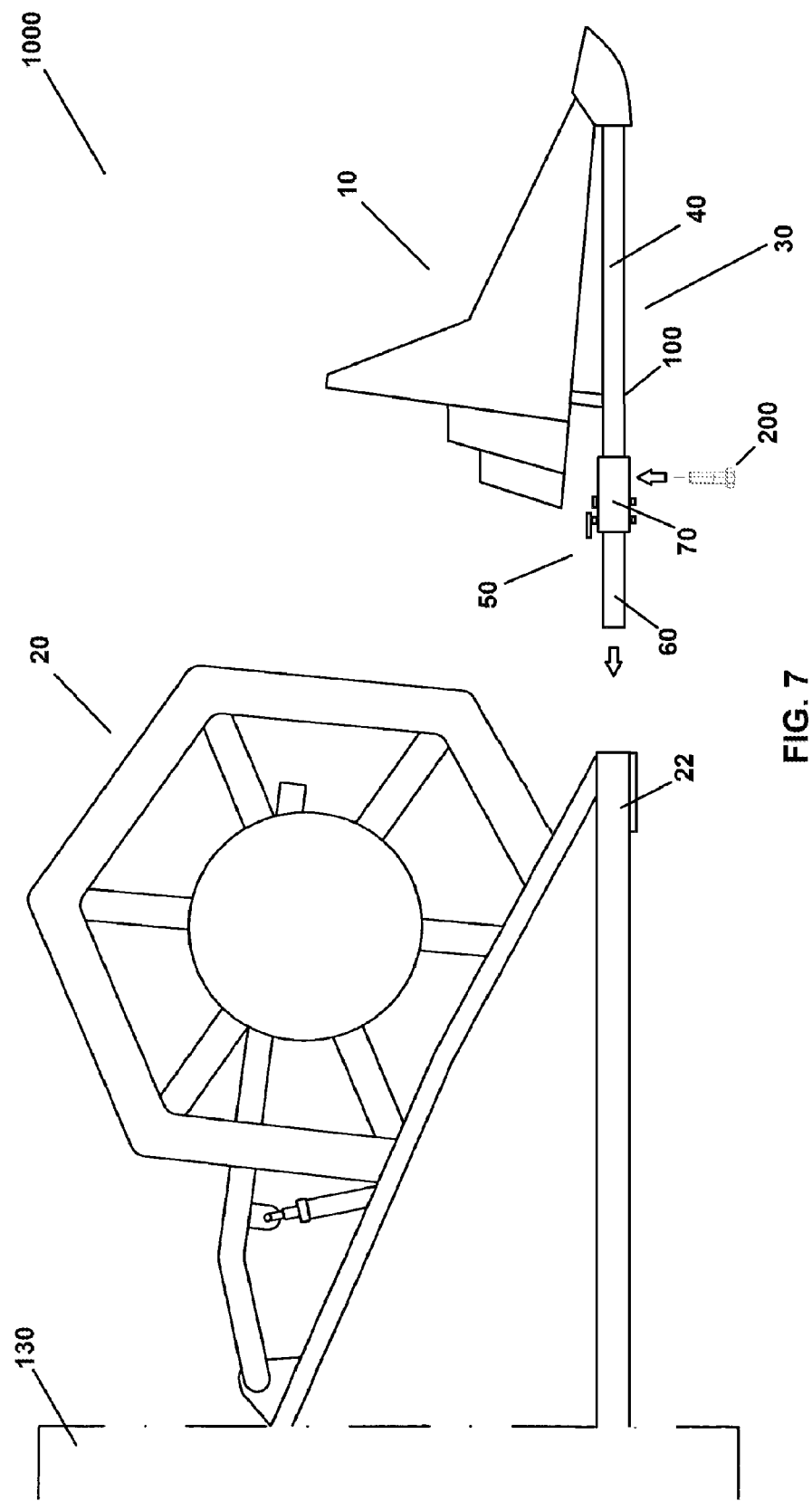
FIG. 7 is a right side elevation view of the crop divider of FIG. 6, depicting fastening the crop divider hinge kit to the crop divider frame with one or more fasteners.
Figure 8:
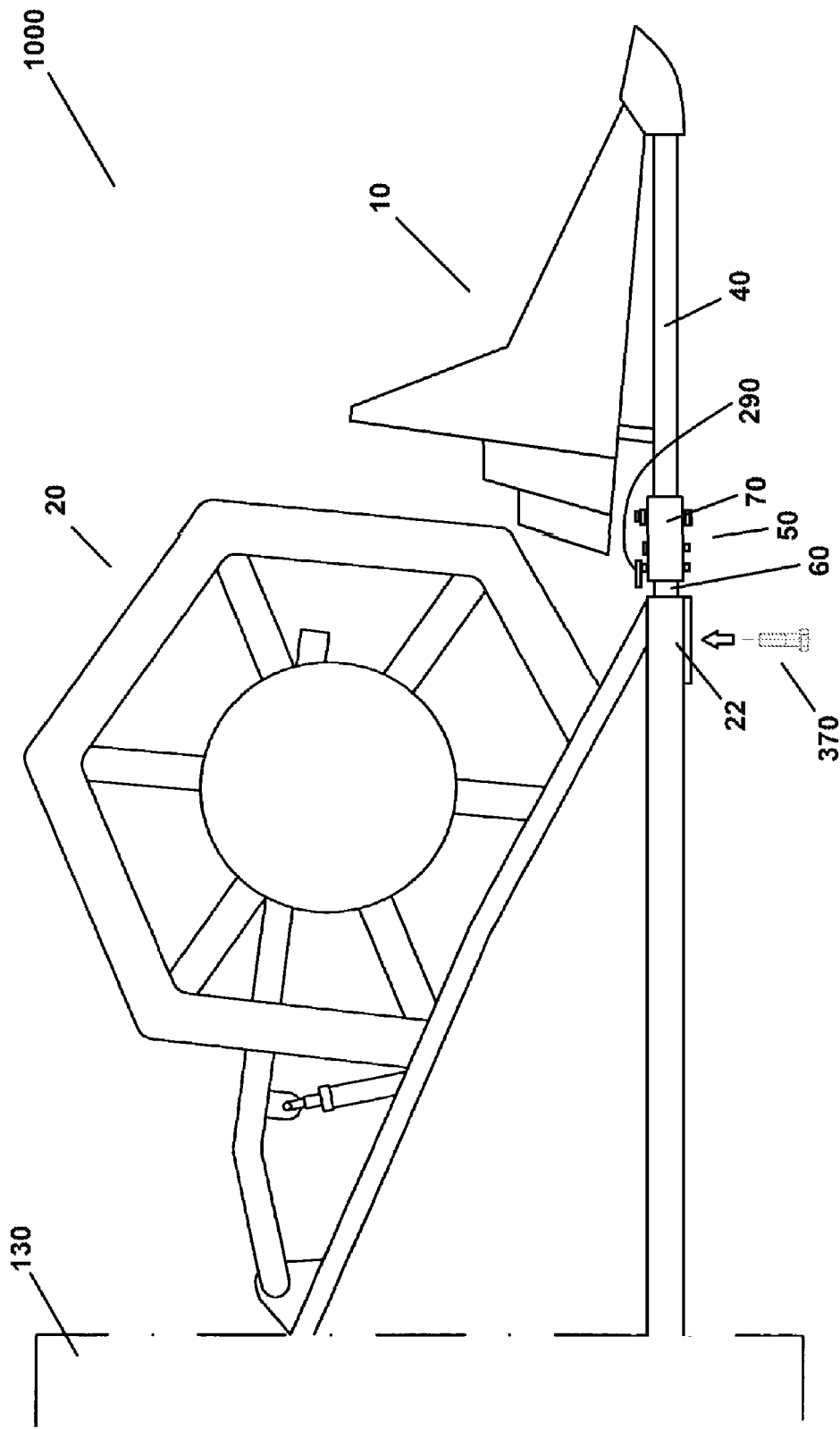
FIG. 8 is a right side elevation view of the crop divider of FIG. 7, depicting connecting the crop divider/hinge kit assembly to the harvester head with the crop divider facing in the forward direction for harvesting crops.
Figure 9:
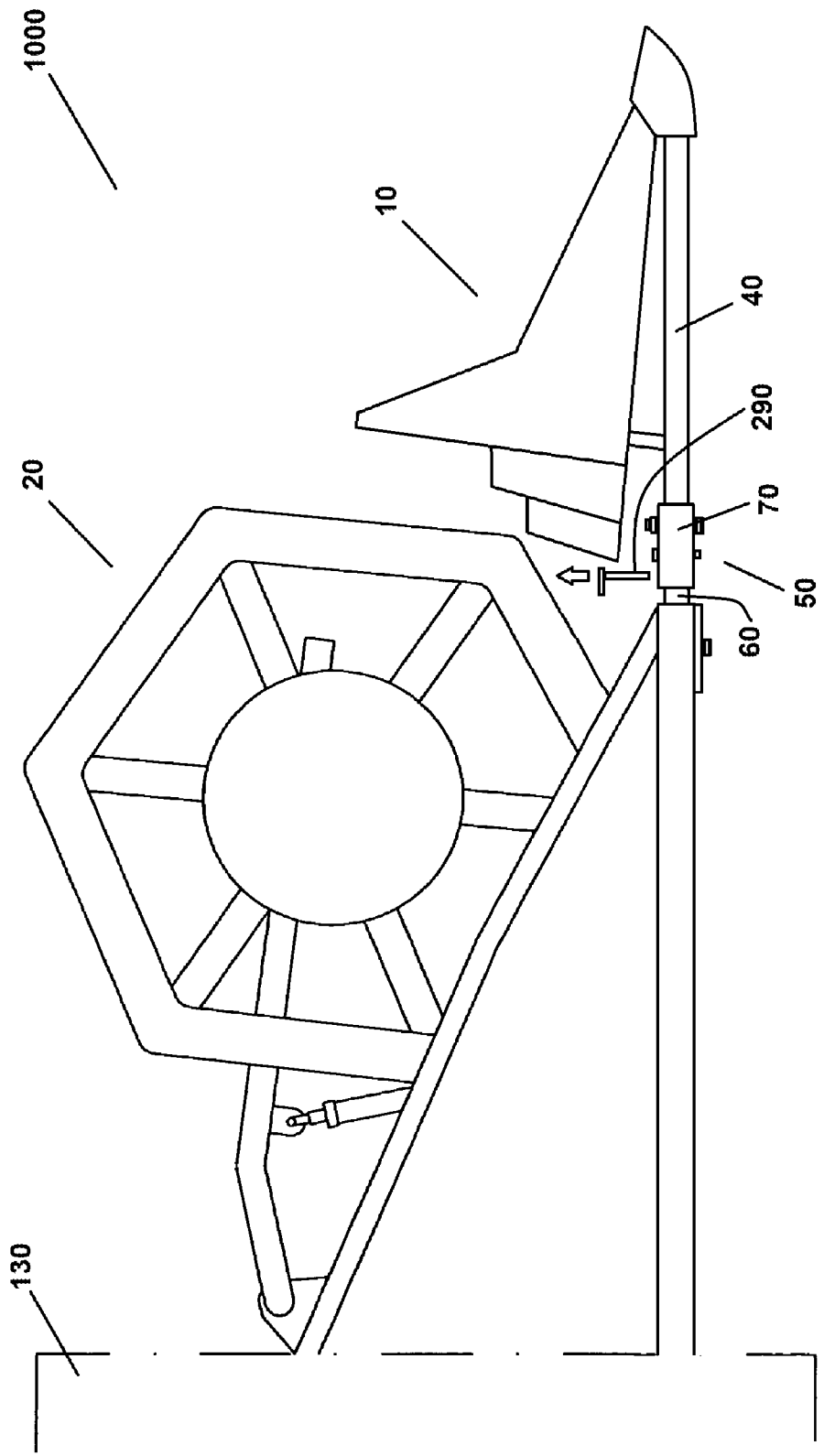
FIG. 9 is a right side elevation view of the crop divider of FIG. 8, depicting removing an example locking member to allow the crop divider to pivot.
Figure 10:
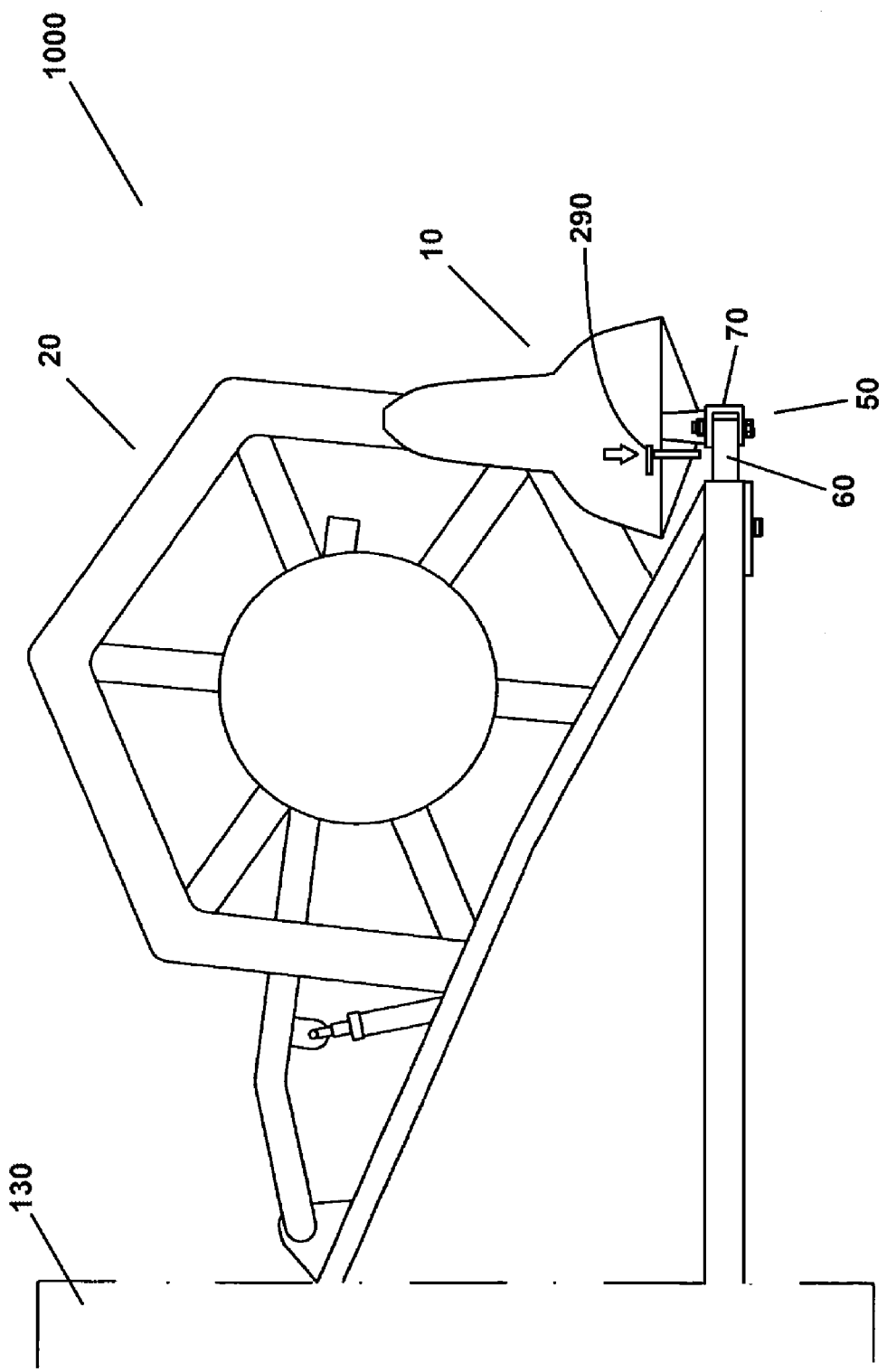
FIG. 10 is a right side elevation view of the crop divider of FIG. 9, depicting the crop divider having been pivoted to a position approximately perpendicular to the forward facing direction of FIG. 8, showing the reinsertion of the example locking member to lock the crop divider in place.
Figure 11:
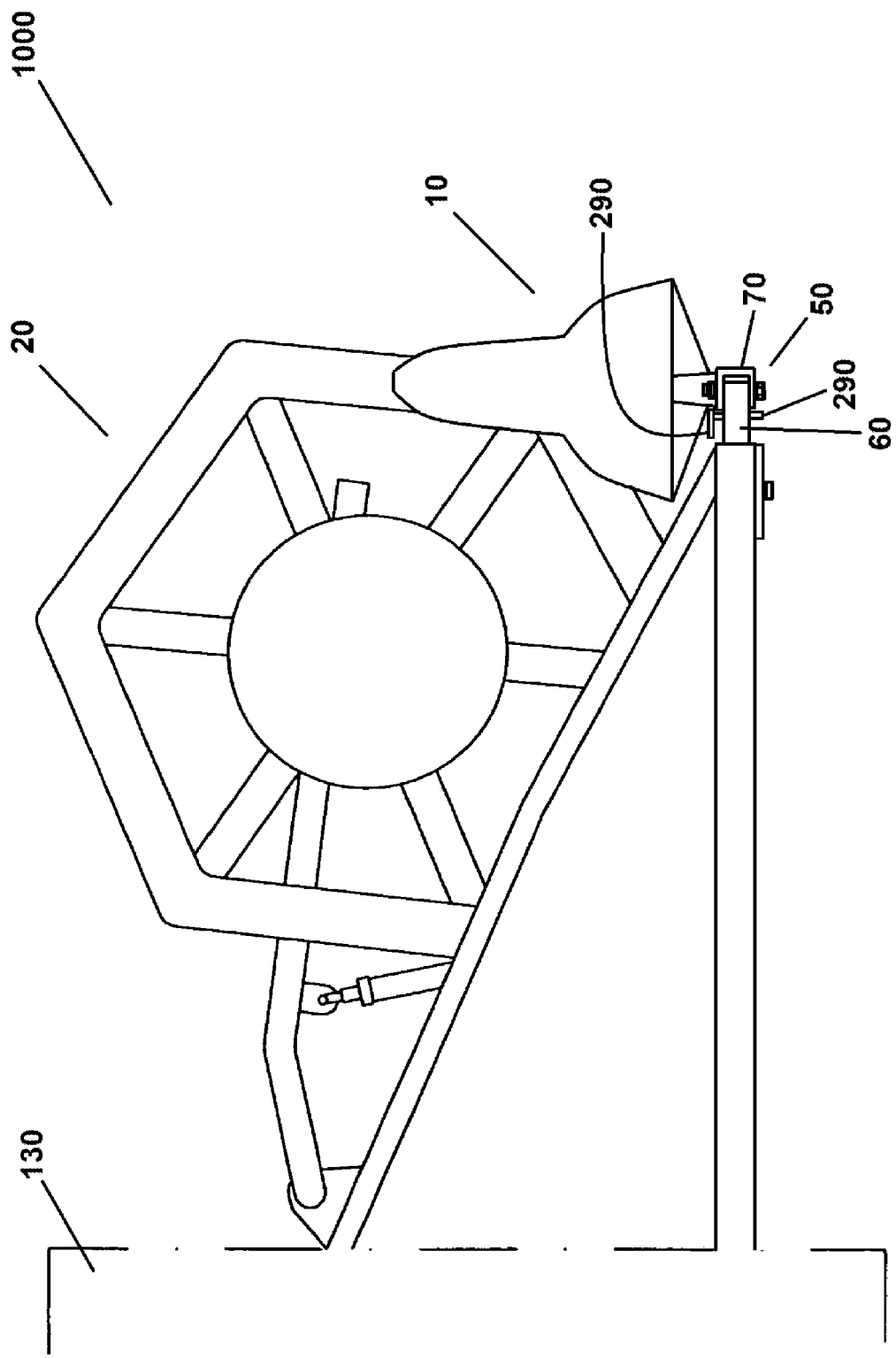
FIG. 11 is a right side elevation view of the crop divider of FIG. 10, depicting the example locking member having been reinserted to lock the crop divider in place. The steps shown in FIG. 9 through FIG. 11 can subsequently be reversed or repeated to alternately pivot the crop divider.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by any claims which may be allowed in this or any related patent application.

With reference to FIGS. 1-19, provided in various example embodiments is a method 1000 of converting a crop divider 10 fixedly connected to a harvester head 20 into a crop divider 10 pivotably connected to the harvester head 20, where the crop divider 10 is initially fixedly connected to the harvester head 20 by a frame 30 comprising square tubing 40. The term "fixedly connected" as used herein may include some relative movement between the crop divider 10 and the harvester head 20, such as a suspension. In various example embodiments the method may comprise the steps of: removing the square tubing portion 40 of the frame 30 from the harvester head 20; cutting off a predetermined length L of the square tubing 40 from the end 42 of the square tubing portion 40 that was connected to the harvester head 20; and connecting a crop divider hinge kit 50 to that portion 22 of the harvester head 20 to which the square tubing portion 40 of the frame 30 was connected. In various example embodiments the step of connecting the crop divider hinge kit 50 to that portion 22 of the harvester head 20 to which the square tubing portion 40 of the frame 30 was connected may be accomplished using one or more fasteners 370 that had fastened the cut-off portion 42 of the square tubing 40 to the harvester head 20. In one example embodiment where the harvester head 20 is a John Deere 640FD HydraFlex™ Draper Platform, predetermined length L may be about ten and a half inches; however, any suitable length L may be used for this or other applications as will be apparent to persons of skill in the art.

With reference to FIGS. 4-19, in various example embodiments the crop divider hinge kit 50 may comprise: a replacement portion 60 of square tubing 40 adapted to connect to that portion 22 of the harvester head 20 to which the square tubing portion 40 of the frame 30 was connected, and further adapted to replace the predetermined length L of square tubing 40 that was cut off from the frame 30; a sleeve portion 70 pivotably connected with the replacement portion 60 of square tubing 40 and defining a hollow portion 80 having an inner profile 90 approximating the outer profile 100 of the square tubing 40 and adapted to receive therein and be affixed to that part of the square tubing 40 comprising the end 44 of the frame 30 from which the predetermined length L of square tubing 40 was cut. In various example embodiments the crop divider hinge kit 50 may be adapted to alternately lock the crop divider 10 in a first longitudinally extending position 110 appropriate for use in dividing crops (not shown here, but the process is illustrated in FIG. 1 of U.S. Pat. No. 4,087,954, separately incorporated herein) and in a second position 120 extending longitudinally approximately perpendicular to the first position, when the replacement portion 60 of square tubing 40 is connected to the harvester head 20 and the end 44 of the frame 30 from which the predetermined length L of square tubing 40 was cut is affixed to sleeve portion 70.

The method described above may further comprise the steps of connecting the crop divider 10 to the crop divider hinge kit 50 by placing the square tubing 40 comprising the end 44 of the frame 30 from which the predetermined length L of square tubing 40 was cut into the hollow portion 80 of the sleeve 70 and affixing said tubing 40 to said sleeve 70; and alternately locking the crop divider 10 in a first longitudinally extending position 110 appropriate for use in dividing crops (see, e.g., FIG. 1 in U.S. Pat. No. 4,087,954) and a second position 120 extending longitudinally approximately perpendicular to the first longitudinally extending position 110, for instance for use in transporting the harvester head 20. In various example embodiments the term "approximately perpendicular" as used herein may be a ninety degree angle, plus or minus normal variations due to manufacturing and assembly. For example, the term "approximately perpendicular" may be a ninety degree angle, plus or minus fifteen degrees or less. The term "locking" as used herein should be interpreted broadly to include latching, fixing, or any other term that describes the functionality of holding the crop divider 10 in place until the user desires to pivot it.

With reference to FIGS. 1-19, provided in various example embodiments is a method of transporting a harvester head 20 having a plurality of crop dividers 10 fixedly connected thereto by frames 30 comprising square tubing 40, the method comprising the steps of: removing the square tubing portion 40 of the frame 30 from the harvester head 20; cutting off a predetermined length L of the square tubing 40 from the end 42 of the square tubing portion 40 that was connected to the harvester head 20; and connecting a crop divider hinge kit 50 to that portion 22 of the harvester head 20 to which the square tubing portion 40 of the frame 30 was connected. The crop divider hinge kit 50 may be constructed as previously described herein. In various example embodiments the method may further comprise the steps of connecting the crop divider 10 to the crop divider hinge kit 50 by placing the square tubing 40 comprising the end 44 of the frame 30 from which the predetermined length L of square tubing 40 was cut into the hollow portion 80 of the sleeve 70 and affixing said tubing 40 to said sleeve 70; and repeating each of the above steps for each crop divider 10 fixedly connected to the harvester head 20 by a frame 30 comprising square tubing 40. In various example embodiments the method may further comprise the steps of locking each crop divider 10 in first longitudinally extending positions 110 appropriate for use in dividing crops (see, e.g., FIG. 1 in U.S. Pat. No. 4,087,954); attaching the harvester head 20 to a combine 130; harvesting crops (see, e.g., FIG. 1 in U.S. Pat. No. 4,087,954) using the harvester head 20 and the combine 130; detaching the harvester head 20 from the combine 130; locking each crop divider 10 in second positions 120 extending longitudinally approximately perpendicular to the first longitudinally extending positions 110; loading the harvester head 20 on a trailer 140; and transporting the harvester head 20 on a public or private road from a first location to a second location.

With reference to FIGS. 6, 7, 14, and 15, in various example embodiments the step of affixing said tubing 40 to said sleeve 70 may further comprise drilling or otherwise forming holes 180 through said tubing 40 using holes 190 in the sleeve 70 as a template to guide the drilling or other hole formation techniques. In various example embodiments the step of affixing said tubing 40 to said sleeve 70 may further comprise fastening said tubing 40 to said sleeve 70 with one or more fasteners 200. In various example embodiments the step of affixing said tubing 40 to said sleeve 70 may comprise welding said tubing 40 to said sleeve 70. In various example embodiments the sleeve portion 70 of the crop divider hinge kit 50 may also comprise hollow square tubing, for instance hollow square tubing that is large enough to receive within itself square tubing 40 (hereafter, in this example embodiment, second square tubing 70). In other embodiments sleeve 70 could have any other suitable geometry, including a round outer diameter, or any other combinations of shapes. In various example embodiments the second square tubing 70 may comprise a first portion 220 comprising a top wall 230 and a bottom wall 240 separated by opposing first and second side walls, 250, 260 respectively, the first side wall 250 or second side 260 wall being partially cut-away in a second portion 225 to form a pivot clearance window 270.

Figure 14:
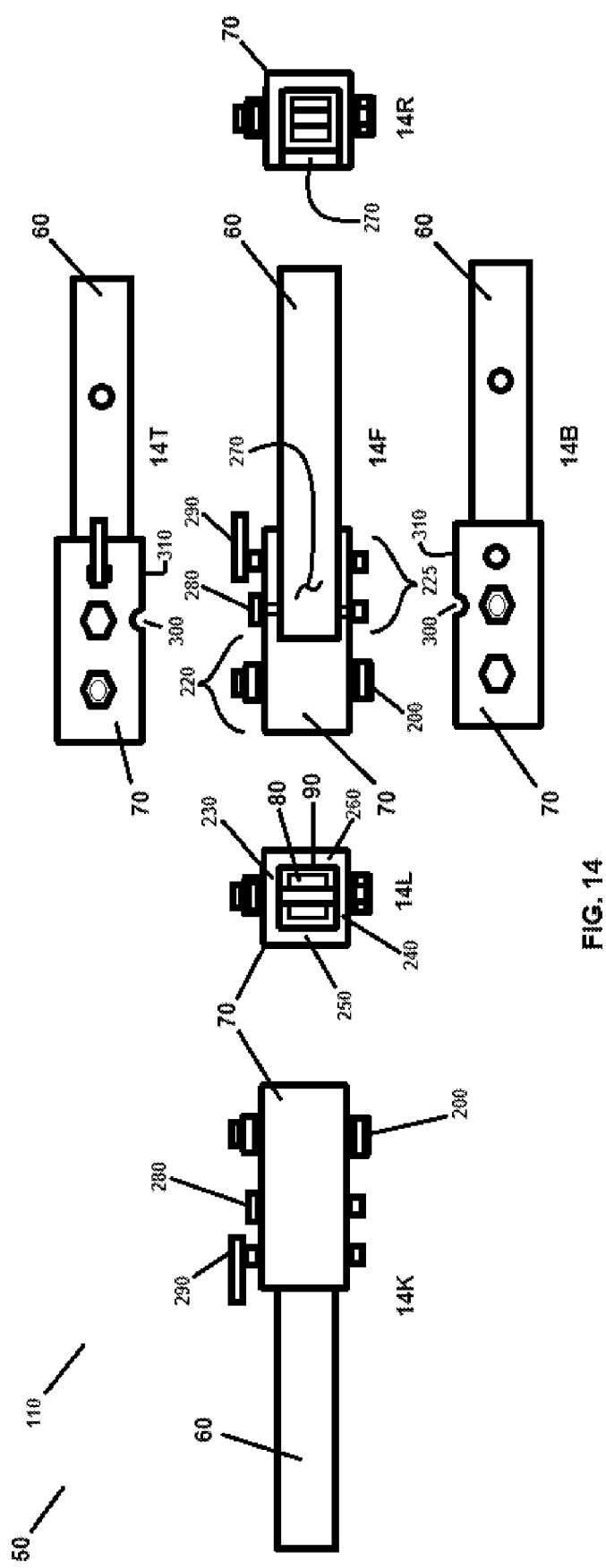
FIG. 14 depicts a crop divider hinge kit assembly locked in the forward-facing direction according to one example embodiment, with 14F being a front elevation view, 14T being a top plan view thereof, 14B being a bottom view thereof, 14R being a right side elevation view thereof, 14L being a left side elevation view thereof, and 14K being a back side elevation view thereof.
Figure 15:
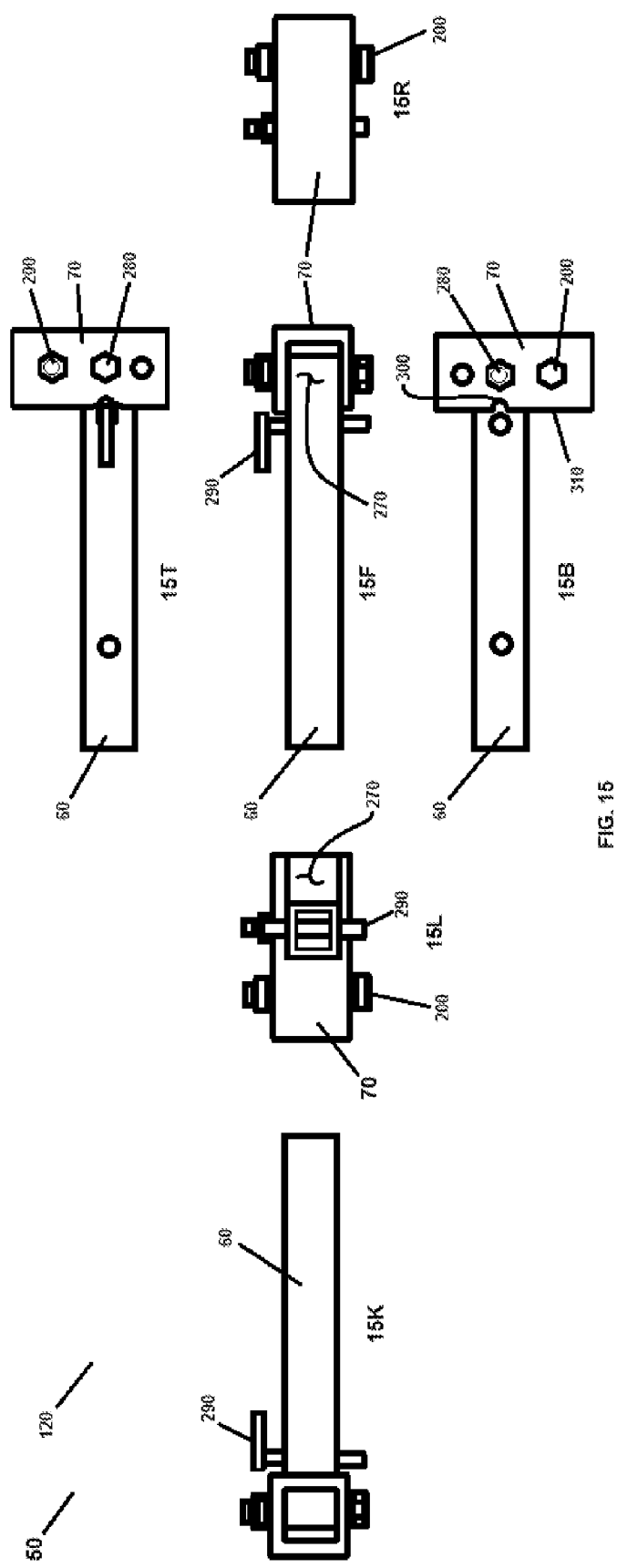
FIG. 15 depicts the example crop divider hinge kit assembly of FIG. 14 locked in a direction approximately perpendicular to the forward-facing direction shown in FIG. 14, with 15F being a front elevation view, 15T being a top plan view thereof, 15B being a bottom view thereof, 15R being a right side elevation view thereof, 15L being a left side elevation view thereof, and 15K being a back side elevation view thereof.
Figure 16:
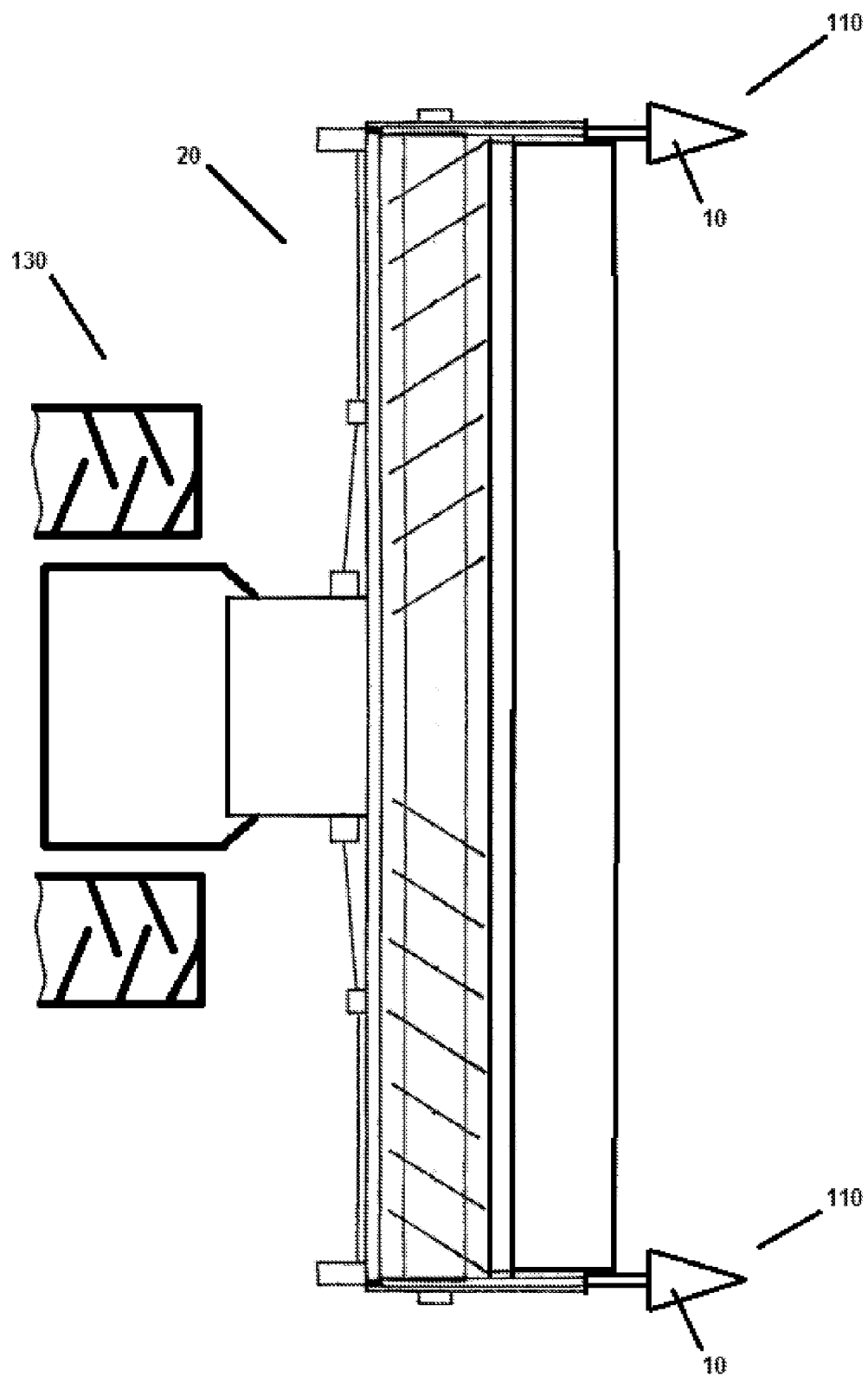
FIG. 16 is a top plan view of an example harvester head connected with an example combine or other harvesting machinery, where the harvester head includes a plurality of crop dividers pivotably attached thereto with an example crop divider hinge kit, with the crop dividers shown facing in the forward direction for harvesting crops.
Figure 17:
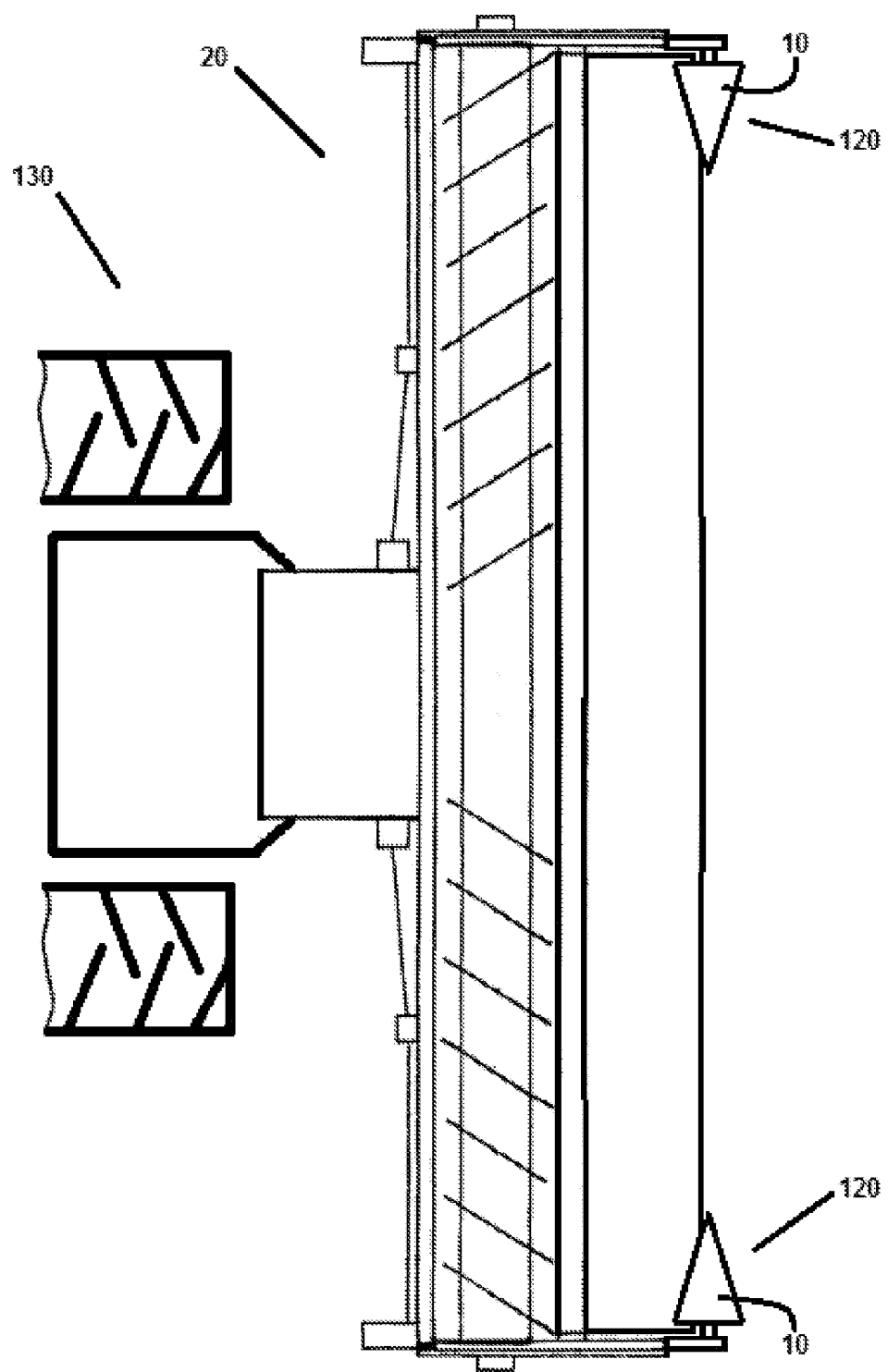
FIG. 17 is a top plan view of the example harvester head assembly of FIG. 16, with the crop dividers shown pivoted to a position approximately perpendicular to the forward facing direction of FIG. 16.
Figure 18:
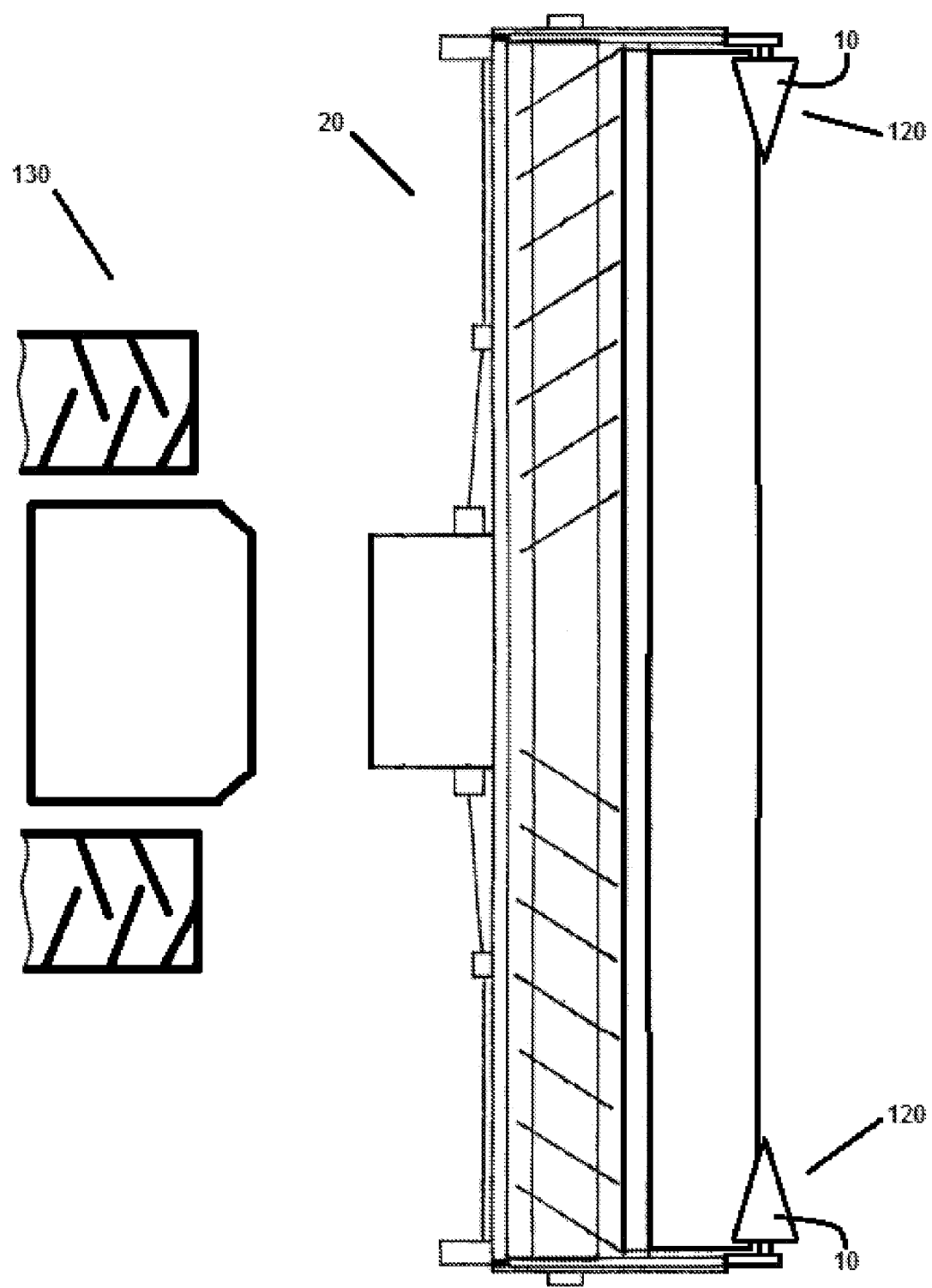
FIG. 18 is a top plan view of the example harvester head assembly of FIG. 17, depicting the removal of the harvester head from the example combine or other harvesting machinery.
Figure 19:
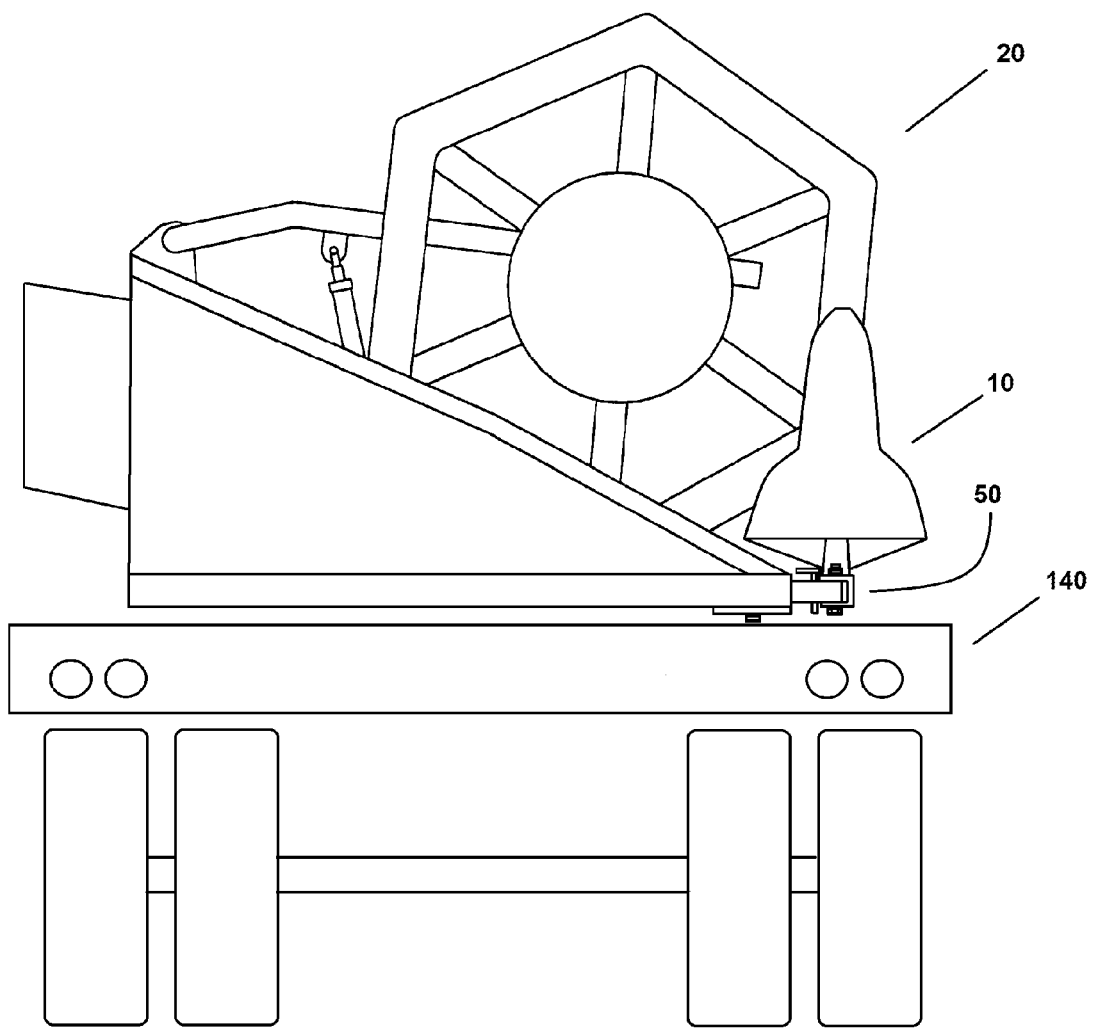
FIG. 19 is a right side elevation view of the crop divider, harvester head, and hinge kit assembly of FIG. 10, shown disconnected from a combine or other harvesting machinery and loaded on an example trailer for transport on public roads, with the crop divider(s) having been safely pivoted and locked into position(s) approximately perpendicular to the forward facing direction used for harvesting crops.

With reference to FIGS. 14 and 15, in various example embodiments the replacement portion 60 of square tubing 40 is pivotably connected with the sleeve portion 70 by a pivot member 280 that passes from the top wall 230 of the second square tubing 70, through the replacement portion 60 of square tubing 40, to the bottom wall 240 of the second square tubing 70. In various example embodiments the pivot member 280 may be positioned proximate the pivot clearance window 270 such that the sleeve portion 70 can pivot relative to the replacement portion 60 of square tubing 40 about the pivot member 280 from a first position 110 where the replacement portion 60 of square tubing 40 extends coaxially with the sleeve portion 70, to a second position 120 where the longitudinal axis of the replacement portion 60 of square tubing 40 extends through the pivot clearance window 270 and approximately perpendicularly to the longitudinal axis of the sleeve portion 70. In various example embodiments pivot member 280 consists of a fastener that passes through the top wall 230, through the square tubing 40, and through the bottom wall 240. In various example embodiments fasteners 200 and/or pivot member 280 may comprise a shaft circumferentially surrounded by a compression-limiting spacer (not shown), such as a hollow steel cylinder, that may be used inside the tubing 40, 60 to strengthen the tubing 40, 60 against the compressive forces of fasteners 220, 280, or may pass through the tubing 40, 60 along with the fasteners 220, 280 and be used to limit the amount of compressive forces applied to the tubing 40, 60 by the fasteners 220, 280, as is known in the mechanical arts.

With reference to FIGS. 8-17, in various example embodiments the step of locking the crop divider 10 in a first longitudinally extending position 110 appropriate for use in dividing crops further comprises: pivoting the sleeve portion 70 relative to the replacement portion 60 of square tubing 40 about the pivot member 280 to the first position 110 where the replacement portion 60 of square tubing 40 extends coaxially with the sleeve portion 70; and inserting a locking member 290 through the top wall 230 of the second square tubing 70, through the replacement portion 60 of square tubing 40, and through the bottom wall 240 of the second square tubing 70. In various example embodiments locking member 290 may comprise, for example, a fastener, a pin, a button handle ball lock pin, a detent pin, a torsion clip, hair pin clip, or any other suitable structure, many examples of which are typically available from commercial hardware providers such as W.W. Grainger, Inc. via its online catalog, or on ebay.com.

With reference to FIGS. 14 and 15, in various example embodiments the step of locking the crop divider 10 in a second position 120 extending longitudinally approximately perpendicular to the first longitudinally extending position 110 further comprises: removing the locking member 290; pivoting the sleeve portion 70 relative to the replacement portion 60 of square tubing 40 about the pivot member 280 to the second position 120 where the longitudinal axis of the replacement portion 60 of square tubing 40 extends through the pivot clearance window 270 and approximately perpendicularly to the longitudinal axis of the sleeve portion 70; and inserting the locking member 290 through the replacement portion 60 of square tubing 40 and simultaneously adjacent to recesses 300 formed in the outer edges 310 of the top wall 230 and the bottom wall 240 of the second square tubing 70 adjacent the pivot clearance window 270. Such recesses 300 may be sized and shaped to correspond to the locking member 290 to better position the locking member 290 and to reduce wear on the outer edges 310 of the top wall 230 and the bottom wall 240 that contact the locking member 290. Note that for purposes of clear illustration of concepts the designs throughout all the Figures are not necessarily to scale.

Figure 12:
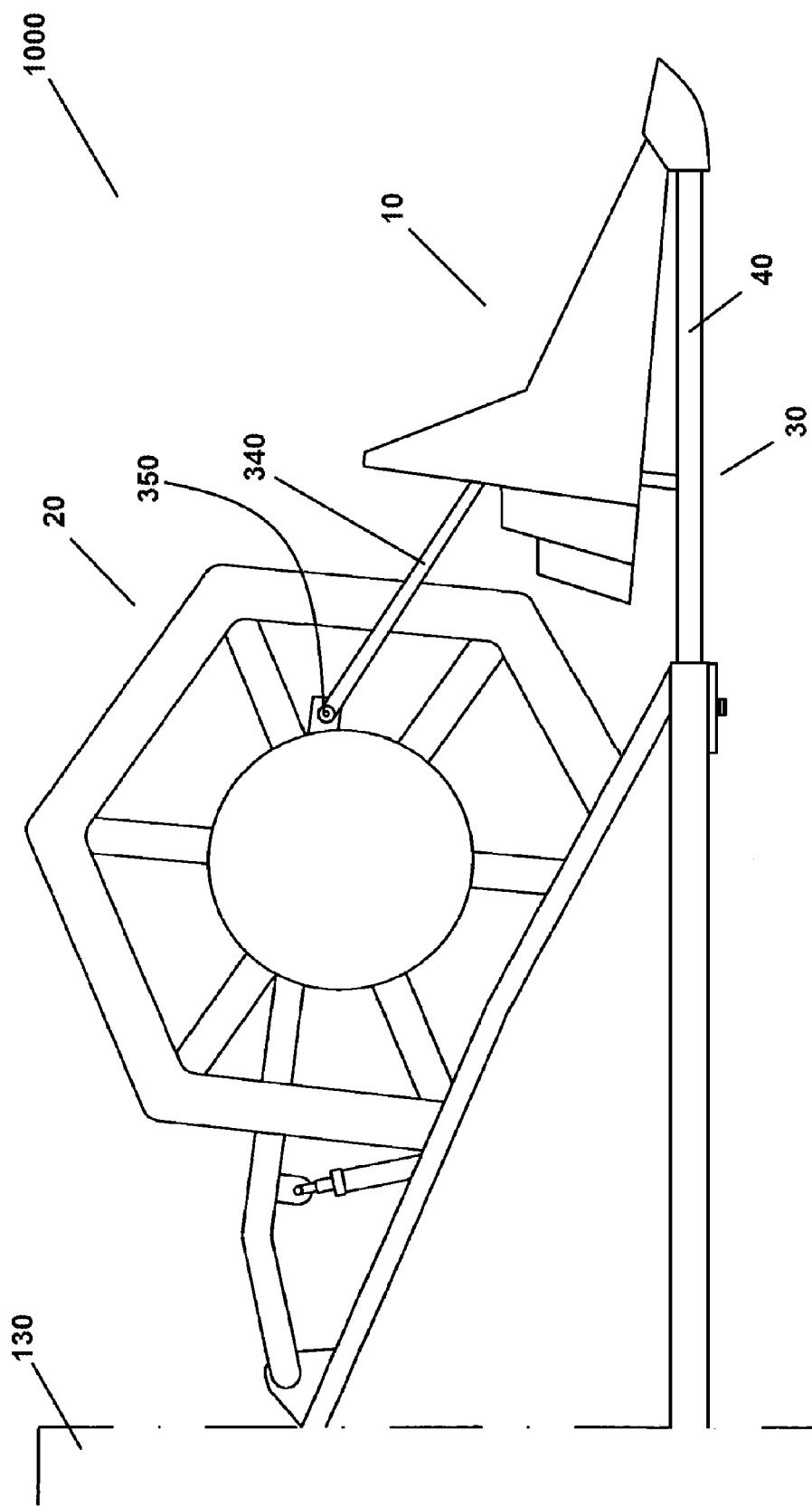
FIG. 12 is a right side elevation view of the example crop divider and harvester head of FIG. 1, further comprising an additional support member connecting the crop divider to the harvester head.
Figure 13:
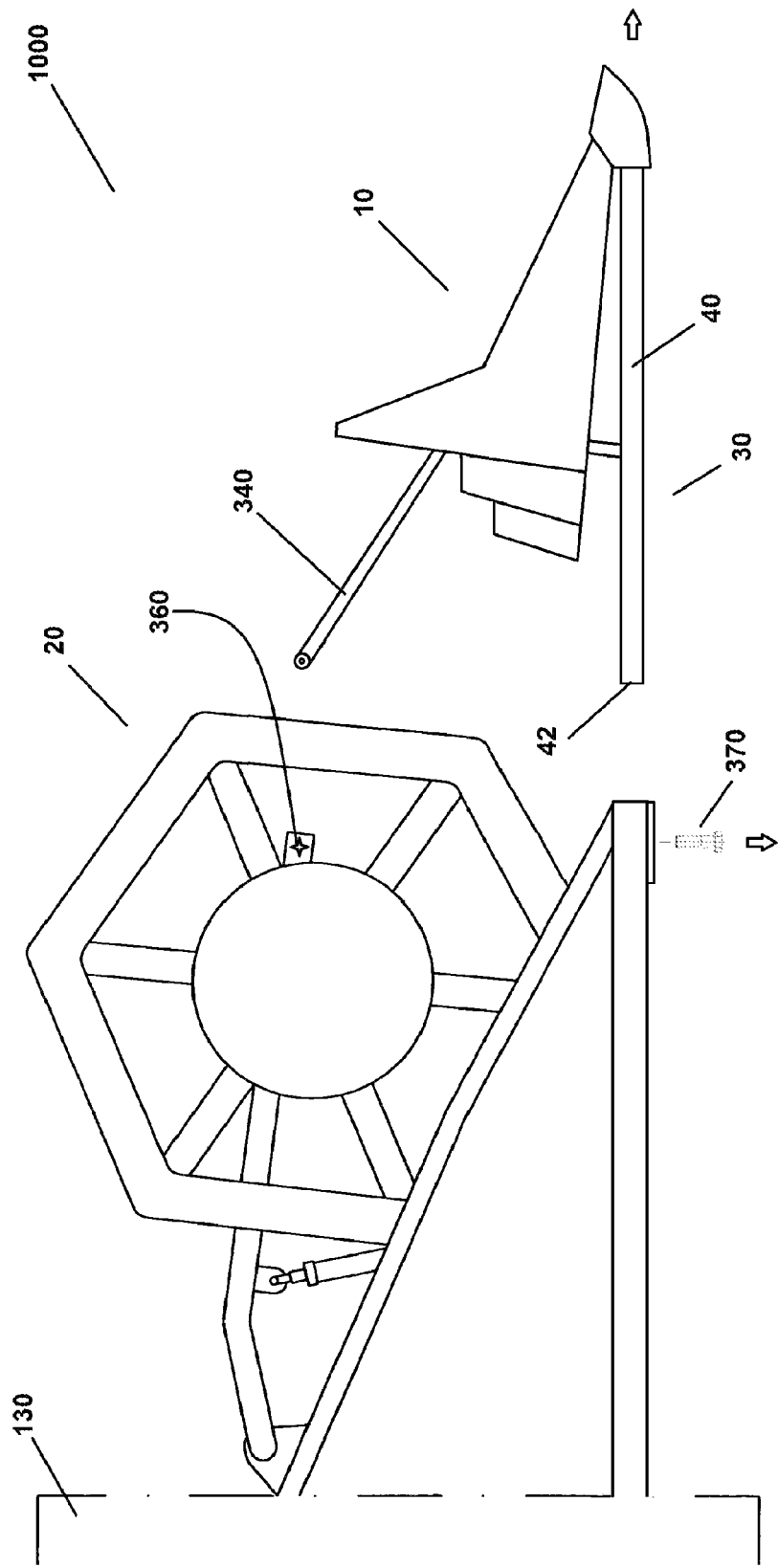
FIG. 13 is a right side elevation view of the example crop divider and harvester head of FIG. 12, depicting the disassembly of the crop divider from the harvester head, and the provision of a quick-disconnect apparatus to facilitate rapid removal and replacement of the support member during pivoting of the crop divider when processed as otherwise shown in FIG. 3 through FIG. 11.

With reference to FIGS. 12 and 13, in various example embodiments crop divider 10 is further connected to the harvester head 20 by one or more support members 340 extending above the square tubing 40 from the crop divider 10 to the harvester head 20, the support member 340 attached to the harvester head 20 with a fastener 350. In various example embodiments the method further comprising the step of: replacing the fastener 350 with a quick-disconnect fastening mechanism 360; wherein the step of locking the crop divider 10 in the first longitudinally extending position 110 further comprises the step of attaching the support member 340 to the harvester head 20 by fastening the quick-disconnect fastening mechanism 360; and wherein the step of locking the crop divider 10 in the second position 120 extending longitudinally approximately perpendicular to the first longitudinally extending position 110 further comprises the step of detaching the support member 340 from the harvester head 20 by unfastening the quick-disconnect fastening mechanism 360. Any suitable quick-disconnect fastening mechanism 360 may be used, such as a button handle ball lock pin, a detent pin, a torsion clip, a Dzus fastener, or a hair pin clip, for instance, many examples of which are typically available from commercial hardware providers such as W.W. Grainger, Inc. via its online catalog, or on ebay.com.

With reference to FIGS. 1-19, in various example embodiments the square tubing 40 may comprise one-and-one-half-inch by one-and-one-half-inch nominal outside width and height ASTM A500 square steel tubing, and the sleeve portion 70 may comprise two-inch by two-inch nominal outside width and height ASTM A500 square steel tubing with 5 Gauge (0.220 inch) nominal wall thickness, all of which is readily available nationwide from commercial steel suppliers. This particular combination fits together closely and works well. However, any other suitable materials, sizes, and shapes may be used as would be apparent to persons of skill in the art. Nominal dimensions are understood to mean approximate, plus or minus normal manufacturing variations.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A method of converting a crop divider fixedly connected to a harvester head into a crop divider pivotably connected to the harvester head, where the crop divider is fixedly connected to the harvester head by a frame comprising square tubing, the method comprising the steps of:
   removing the square tubing portion of the frame from the harvester head;
   cutting off a predetermined length of the square tubing from the end of the square tubing portion that was connected to the harvester head;
   connecting a crop divider hinge kit to that portion of the harvester head to which the square tubing portion of the frame was connected, the crop divider hinge kit comprising:
      a replacement portion of square tubing adapted to connect to that portion of the harvester head to which the square tubing portion of the frame was connected, and further adapted to replace the predetermined length of square tubing that was cut off from the frame;
      a sleeve portion pivotably connected with the replacement portion of square tubing and defining a hollow portion having an inner profile approximating the outer profile of the square tubing and adapted to receive therein and be affixed to that part of the square tubing comprising the end of the frame from which the predetermined length of square tubing was cut;
      the crop divider hinge kit adapted to alternately lock the crop divider in a first longitudinally extending position appropriate for use in dividing crops and in a second position extending longitudinally approximately perpendicular to the first position, when the replacement portion of square tubing is connected to the harvester head and the end of the frame from which the predetermined length of square tubing was cut is affixed to sleeve portion;
   connecting the crop divider to the crop divider hinge kit by placing the square tubing comprising the end of the frame from which the predetermined length of square tubing was cut into the hollow portion of the sleeve and affixing said tubing to said sleeve; and
   alternately locking the crop divider in a first longitudinally extending position appropriate for use in dividing crops and a second position extending longitudinally approximately perpendicular to the first longitudinally extending position.

2. The method of claim 1, wherein the step of affixing said tubing to said sleeve further comprises drilling holes through said tubing using holes in the sleeve as a template to guide the drilling.

3. The method of claim 1, wherein the step of affixing said tubing to said sleeve further comprises fastening said tubing to said sleeve with one or more fasteners.

4. The method of claim 1, wherein the step of affixing said tubing to said sleeve further comprises welding said tubing to said sleeve.

5. The method of claim 1, wherein the sleeve portion of the crop divider hinge kit comprises second square tubing.

6. The method of claim 5, wherein the second square tubing comprises a first portion comprising a top wall and a bottom wall separated by opposing first and second side walls, the first or second side wall being partially cut-away to form a pivot clearance window.

7. The method of claim 6, wherein the replacement portion of square tubing is pivotably connected with the sleeve portion by a pivot member that passes from the top wall of the second square tubing, through the replacement portion of square tubing, to the bottom wall of the second square tubing, the pivot member positioned proximate the pivot clearance window such that the sleeve portion can pivot relative to the replacement portion of square tubing about the pivot member from a first position where the replacement portion of square tubing extends coaxially with the sleeve portion, to a second position where the longitudinal axis of the replacement portion of square tubing extends through the pivot clearance window and approximately perpendicularly to the longitudinal axis of the sleeve portion.

8. The method of claim 7, wherein the step of locking the crop divider in a first longitudinally extending position appropriate for use in dividing crops further comprises:
   pivoting the sleeve portion relative to the replacement portion of square tubing about the pivot member to the first position where the replacement portion of square tubing extends coaxially with the sleeve portion; and
   inserting a locking member through the top wall of the second square tubing, through the replacement portion of square tubing, and through the bottom wall of the second square tubing.

9. The method of claim 8, wherein the step of locking the crop divider in a second position extending longitudinally approximately perpendicular to the first longitudinally extending position further comprises:
   removing the locking member;
   pivoting the sleeve portion relative to the replacement portion of square tubing about the pivot member to the second position where the longitudinal axis of the replacement portion of square tubing extends through the pivot clearance window and approximately perpendicularly to the longitudinal axis of the sleeve portion; and
   inserting the locking member through the replacement portion of square tubing and simultaneously adjacent to recesses formed in the outer edges of the top and bottom walls of the second square tubing adjacent the pivot clearance window.

10. The method of claim 7, wherein the pivot member consists of a fastener that passes through the top wall, through the square tubing, and through the bottom wall.

11. The method of claim 7, wherein the pivot member comprises a fastener having a shaft circumferentially surrounded by a compression-limiting spacer.

12. The method of claim 8, wherein the locking member is selected from the group consisting of: a fastener, a pin, a button handle ball lock pin, a detent pin, a torsion clip, hair pin clip.

13. The method of claim 9, wherein the locking member is selected from the group consisting of: a fastener, a pin, a button handle ball lock pin, a detent pin, a torsion clip, hair pin clip.

14. The method of claim 1, where the crop divider is further connected to the harvester head by a support member extending above the square tubing from the crop divider to the harvester head, the support member attached to the harvester head with a fastener, the method further comprising the step of:
replacing the fastener with a quick-disconnect fastening mechanism;
wherein the step of locking the crop divider in the first longitudinally extending position further comprises the step of attaching the support member to the harvester head by fastening the quick-disconnect fastening mechanism; and
wherein the step of locking the crop divider in the second position extending longitudinally approximately perpendicular to the first longitudinally extending position further comprises the step of detaching the support member from the harvester head by unfastening the quick-disconnect fastening mechanism.

15. The method of claim 1, wherein the step of connecting the crop divider hinge kit to that portion of the harvester head to which the square tubing portion of the frame was connected further comprises: fastening the crop divider hinge kit to the harvester head using fasteners that had fastened the cut-off portion of the square tubing to the harvester head.

16. The method of claim 1, wherein the square tubing comprises one-and-one-half-inch by one-and-one-half-inch nominal outside width and height ASTM A500 square tubing, and the sleeve portion comprises two-inch by two-inch nominal outside width and height ASTM A500 square tubing with 5 Gauge (0.220 inch) nominal wall thickness.

17. A method of converting a crop divider fixedly connected to a harvester head into a crop divider pivotably connected to the harvester head, where the crop divider is fixedly connected to the harvester head by a frame comprising square tubing, the method comprising the steps of:
removing the square tubing portion of the frame from the harvester head;
cutting off a predetermined length of the square tubing from the end of the square tubing portion that was connected to the harvester head;
connecting crop divider hinge means to that portion of the harvester head to which the square tubing portion of the frame was connected, the crop divider hinge means comprising:
means for connecting a hinge to that portion of the harvester head to which the square tubing portion of the frame was connected, and for replacing the predetermined length of square tubing that was cut off from the frame;
means for pivotably connecting the hinge to that part of the square tubing comprising the end of the frame from which the predetermined length of square tubing was cut;
means for alternately locking the crop divider in a first longitudinally extending position appropriate for use in dividing crops and in a second position extending longitudinally approximately perpendicular to the first position, when the hinge is installed and connecting the crop divider to the harvester head;
connecting the crop divider to the crop divider hinge means; and
alternately locking the crop divider in a first longitudinally extending position appropriate for use in dividing crops and a second position extending longitudinally approximately perpendicular to the first longitudinally extending position.

18. The method of claim 17, wherein the square tubing comprises one-and-one-half-inch by one-and-one-half-inch nominal outside width and height ASTM A500 square tubing, and the means for pivotably connecting the hinge to the square tubing comprises two-inch by two-inch nominal outside width and height ASTM A500 square tubing with 5 Gauge (0.220 inch) nominal wall thickness.

19. The method of claim 17, where the crop divider is further connected to the harvester head by a support member extending above the square tubing from the crop divider to the harvester head, the support member attached to the harvester head with a fastener, the method further comprising the step of:
replacing the fastener with a quick-disconnect fastening mechanism;
wherein the step of locking the crop divider in the first longitudinally extending position further comprises the step of attaching the support member to the harvester head by fastening the quick-disconnect fastening mechanism; and
wherein the step of locking the crop divider in the second position extending longitudinally approximately perpendicular to the first longitudinally extending position further comprises the step of detaching the support member from the harvester head by unfastening the quick-disconnect fastening mechanism.

20. A method of transporting a harvester head having a plurality of crop dividers fixedly connected thereto by frames comprising square tubing, the method comprising the steps of:
removing the square tubing portion of the frame from the harvester head;
cutting off a predetermined length of the square tubing from the end of the square tubing portion that was connected to the harvester head;
connecting a crop divider hinge kit to that portion of the harvester head to which the square tubing portion of the frame was connected, the crop divider hinge kit comprising:
a replacement portion of square tubing adapted to connect to that portion of the harvester head to which the square tubing portion of the frame was connected, and further adapted to replace the predetermined length of square tubing that was cut off from the frame;
a sleeve portion pivotably connected with the replacement portion of square tubing and defining a hollow portion having an inner profile approximating the outer profile of the square tubing and adapted to receive therein and be affixed to that part of the square tubing comprising the end of the frame from which the predetermined length of square tubing was cut;

the crop divider hinge kit adapted to alternately lock the crop divider in a first longitudinally extending position appropriate for use in dividing crops and in a second position extending longitudinally approximately perpendicular to the first position, when the replacement portion of square tubing is connected to the harvester head and the end of the frame from which the predetermined length of square tubing was cut is affixed to sleeve portion;

connecting the crop divider to the crop divider hinge kit by placing the square tubing comprising the end of the frame from which the predetermined length of square tubing was cut into the hollow portion of the sleeve and affixing said tubing to said sleeve;

repeating each of the above steps for each crop divider fixedly connected to the harvester head by a frame comprising square tubing;

locking each crop divider in first longitudinally extending positions appropriate for use in dividing crops;

attaching the harvester head to a combine;

harvesting crops using the harvester head and the combine;

detaching the harvester head from the combine;

locking each crop divider in second positions extending longitudinally approximately perpendicular to the first longitudinally extending positions;

loading the harvester head on a trailer; and transporting the harvester head on a public road from a first location to a second location.

* * * * *